US012773748B2

(12) United States Patent
Nolte et al.

(10) Patent No.: US 12,773,748 B2
(45) Date of Patent: Oct. 27, 2026

(54) METHOD FOR DETERMINING A POSITION OF A WORKPIECE FOR A LASER MACHINING PROCESS, AND LASER MACHINING SYSTEM

(71) Applicant: PRECITEC GMBH & CO. KG, Gaggenau-Bad Rotenfels (DE)

(72) Inventors: Jonas Nolte, Karlsruhe (DE); Sascha Grau, Karlsruhe (DE); Alexis Donke, Pforzheim (DE); Thorsten Lorenz, Iffezheim (DE); Wei Quang Duong, Rastatt (DE); Rüdiger Moser, Malsch (DE); Jens Reiser, Rheinstetten (DE); Markus Kogel-Hollacher, Haibach (DE); Jens Weidensdörfer, Gernsbach (DE)

(73) Assignee: PRECITEC GMBH & CO. KG, Gaggenau-Bad Rotenfels (DE)

(*) Notice: Subject to any disclaimer, the term of this patent is extended or adjusted under 35 U.S.C. 154(b) by 834 days.

(21) Appl. No.: 18/019,571

(22) PCT Filed: Aug. 2, 2021

(86) PCT No.: PCT/EP2021/071557
§ 371 (c)(1),
(2) Date: Feb. 3, 2023

(87) PCT Pub. No.: WO2022/029073
PCT Pub. Date: Feb. 10, 2022

(65) Prior Publication Data

US 2023/0271272 A1 Aug. 31, 2023

(30) Foreign Application Priority Data

Aug. 5, 2020 (DE) ........................ 102020120649.6

(51) Int. Cl.
*B23K 26/03* (2006.01)
*B23K 26/24* (2014.01)
*B23K 101/36* (2006.01)

(52) U.S. Cl.
CPC ............ *B23K 26/032* (2013.01); *B23K 26/24* (2013.01); *B23K 2101/36* (2018.08)

(58) Field of Classification Search
CPC .... B23K 31/125; B23K 26/24; B23K 26/032; B23K 26/21; H02K 15/0421; H02K 2213/03
See application file for complete search history.

(56) References Cited

U.S. PATENT DOCUMENTS 4,924,063 A 5/1990 Büchel et al.
2014/0175071 A1 6/2014 Pfitzner et al.
(Continued)

FOREIGN PATENT DOCUMENTS

CN 204747769 U * 11/2015
CN 109791042 A 5/2019
(Continued)

OTHER PUBLICATIONS

CN First Office Action dated Mar. 22, 2025 pertaining to CN application No. 202180068393.8 filed Aug. 2, 2021, pp. 1-6.
(Continued)

*Primary Examiner* — Thien S Tran
(74) *Attorney, Agent, or Firm* — Dinsmore & Shohl LLP

(57) ABSTRACT

A method for determining a position of a workpiece for a laser machining process includes the steps of: radiating a measurement beam to at least one workpiece and a support device surrounding the workpiece along at least one first and along at least one second measurement path, the first path forming a predetermined angle with the second path; acquiring a portion of the radiated measurement beam, reflected by
(Continued)

the support device and the workpiece, along the first and along the second measurement path and generating a corresponding measurement signal, the support device and the workpiece comprising a reflectivity different from each other; and determining a position of the workpiece based on the measurement signal. A method for machining a workpiece by a laser beam includes the method for determining the position of the workpiece. An apparatus for determining a position of a workpiece is configured for conducting the methods.

20 Claims, 10 Drawing Sheets

(56) References Cited

U.S. PATENT DOCUMENTS

2016/0059347 A1* 3/2016 Kogel-Hollacher ........................ B23K 26/082 219/121.73
2023/0073600 A1* 3/2023 Hofmann ............... B23K 26/21

FOREIGN PATENT DOCUMENTS

| | | | | |
|---|---|---|---|---|
| DE | 102010060958 A1 * | 6/2012 | ............. | B23K 26/21 |
| DE | 102017102762 A1 | 8/2018 | | |
| EP | 3865242 A1 * | 8/2021 | ............. | H02K 15/35 |

OTHER PUBLICATIONS

Deyneka Dupriez Nataliya. “OCT für das SchweiBen von Hair Pins” Laser Magazin Feb. 2020, May 1, 2020 (May 1, 2020), pp. 14-16, Retrieved from the Internet: http://www.lessmueller.de/images/ Aktuelles/Laser_Magazin_2_2020.pdf [retrieved on Nov. 25, 2021].
Deyneka Dupriez Nataliya. “OCT produces a better weld” Industrial Laser Solutions, Sep. 1, 2019 (Sep. 1, 2019), Retrieved from the Internet: https :/ /www.industrial-lasers.com/welding/article/ 14039499/ oct-produces-a-better-weld [retrieved on Nov. 26, 2021].
Trumpftube. “Trumpf Lasersystems: Paint stripping and welding of hairpins with TruLaser Cell 3000 and VisionLine” Oct. 16, 2018 (Oct. 16, 2018). Retrieved from the Internet: https:/ /www.youtube.com/watch ?v=xwtlLkx Y ei4 [retrieved on Nov. 25, 2021].

* cited by examiner

METHOD FOR DETERMINING A POSITION OF A WORKPIECE FOR A LASER MACHINING PROCESS, AND LASER MACHINING SYSTEM

CROSS-REFERENCE TO RELATED APPLICATIONS

This application is the U.S. National Stage of PCT/EP2021/071557 filed on Aug. 2, 2021, which claims priority to German Patent Application 102020120649.6 filed on Aug. 5, 2020, the entire content of both are incorporated herein by reference in their entirety.

FIELD OF THE INVENTION

The present invention relates to a method for determining a position of a workpiece, especially a position of a hairpin electrode, for a material machining process such as a laser machining process, for example a laser welding or laser cutting process.

BACKGROUND OF THE INVENTION

In a laser machining system for machining a workpiece by means of a laser beam, the laser beam exiting a laser source or an end of a laser-guide fiber is focused or bundled, with the help of a beam guiding and focusing optic, on the workpiece to be machined, to locally heat the workpiece to the melting temperature. The machining may comprise methods for joining workpieces, for example, laser welding or laser soldering, or a laser cutting method as well. The laser machining system may comprise a laser machining apparatus, for example, a laser machining head.

In the field of electromobility, manufacturing electric motors, especially manufacturing stators for electric motors, plays a central role. In order to make the serial production of electric motors, especially traction motors, flexible and allow for large quantities, highly precise and process-stable systems are required.

In order to simplify the costly and hard to automate winding process for manufacturing the stator coil, winding segments, so-called hairpins or rod electrodes, from rectangular copper wire are introduced in the stator groove. The hairpins are subsequently connected to each other, for example, by skewing and welding them together. The welding together occurs, for example, by means of laser welding.

Requirements to the welding joint between the hairpins are a number of pores as low as possible and a bonding cross-section as large as possible. Therefore, to ensure the quality of the welding joint, a highly precise and robust position and posture recognition, respectively, of the hairpins (component posture recognition) and a size determination of the gap between the hairpins before the welding together is of great importance.

According to the current art, the component posture recognition, especially of hairpins, usually occurs with the help of a camera. In this case, x and y coordinates are usually determined by image analysis and, optionally, other parameters, e.g., a gap between hairpins, are derived therefrom. Sometimes, such optical methods for component posture recognition have problems in precisely determining the posture of the hairpins and are prone to errors. Disturbance variables as for example changing light conditions in the production hall and metallic reflective surfaces of support devices, holding and fixing the hairpins twisted with each other, complicate a precise, reproducible, and robust position recognition of the hairpins or make it fully impossible.

An alternative to posture recognition by means of camera-based systems are systems based on optical coherence tomography ("Optical coherence tomography", "OCT"). Such systems allow methods for posture recognition, which measure intervals and thus can represent the posture of the hairpins both, in the x and y directions as well as the z direction, also in the three-dimensional space. A disadvantage of the OCT technology is, however, the cost of such systems.

The application DE 10 2019 122 047 describes a sensor module for monitoring laser welding processes, including a plurality of detectors or sensors detecting different parameters of the process radiation and outputting the same as a measurement signal.

The application DE 10 2020 104 462.3 describes a method for analyzing a welding joint in laser welding of workpieces. The method is carried out during the laser welding process and is based on acquiring and evaluating plasma radiation or of temperature radiation, in addition to laser radiation reflected by the workpieces. Thus, it is possible to recognize whether there is a gap between the connected workpieces and whether there is a welding joint, especially an electrical contact, between the workpieces.

The application DE 10 2020 111 038.3 describes a method for analyzing a welding seam formed by a laser welding process, especially for the recognition of "false friends" or for the differentiation of good weldings and bad weldings, respectively. In this course, after carrying out the actual laser welding process, a laser beam with lower laser power than in the laser welding process is radiated to the welding seam and laser radiation reflected by the welding seam is detected and evaluated. Due to the different surface properties of the welding seam of good and bad weldings, inferences on the presence of a welding joint between the workpieces may be drawn based on the reflected laser radiation.

SUMMARY OF THE INVENTION

An object of the invention is to provide a method by which the position of at least one workpiece, especially at least one hairpin, may be determined easily, quickly, and precisely. It is further an object of the invention to provide a method which allows a robust and perturbation-resistant determination of a position of a workpiece. Eventually, it is an object of the invention, to provide a method which may easily be integrated in existing methods or existing serial facilities, respectively, for laser material machining. It is further an object of the invention to set forth a method for determining a position of a workpiece for a laser machining process, subsequent to which the laser machining process may be conducted immediately.

The invention is based on the idea of determining the position of a workpiece based on reflected radiation, acquired by means of a photodiode, for example. This may be the workpiece (still) to be machined or a workpiece (already) machined. To do so, a measurement beam is guided over the workpiece or the workpieces, respectively, e.g., two hairpins, also referred to as i-pins, and a support device surrounding the workpiece or the workpieces, respectively, and a reflected or back-scattered portion of the measurement light or of the measurement beam, respectively, is captured, e.g., with a photodiode, and a corresponding measurement signal is generated. The workpiece or the workpieces, especially two hairpins, may be held by the support device or clamped in the support device, respectively. The reflected portion may be reflected by the workpiece or the support device. Possibly, e.g., in a gap, no measurement light is reflected, as well. The workpiece and the support device preferably exhibit different reflection behavior, for example, due to different materials or different surface roughnesses, respectively. For example, a measurement beam is strongly reflected by a workpiece of copper, so that the measurement signal takes on a relatively high value, while the portion of the measurement beam reflected by a support device of aluminum or steel is very low and the measurement signal takes on a relatively small value. Therefore, it may be determined whether the measurement beam was radiated to a corresponding point along the measurement path on the workpiece or on the support device. Therefore, based on the measurement signal, the existence and/or the position of the workpiece, especially of the unprocessed workpiece, or the position and/or the surface property of the machined workpiece may be determined. In other words, it may be determined, e.g., in a pre-process method, whether the workpiece is present at all and whether it is positioned regularly, respectively, for example, with regard to a laser machining system or the support device or in a reference or coordinate system, respectively, especially whether it is mounted or chucked in the support device properly. In case a plurality of workpieces exist in or on the support device, respectively, also the size of gap existing a between the workpieces or an interval between the workpieces, respectively, may be determined. In a case where the method is carried out as a post-process method for a welding process, on the contrary, e.g., a position of a welding seam or welding dome and/or an interval between a plurality of welding seams or welding domes, respectively, and/or a diameter or a size, respectively, of a welding seam or welding dome may be determined. The interval may be a creepage distance between two welded hairpins.

According to a first aspect of the present invention, a method for determining a position of a workpiece for a laser machining process, especially a method for determining a position of a workpiece before and/or after a laser machining process, is given, the method comprising the steps: radiating a measurement beam to at least one workpiece and a support device surrounding the at least one workpiece, along at least one first measurement path and along at least one second measurement path; acquiring a portion of the radiated measurement beam, reflected by the support device and the at least one workpiece, along the first measurement path and along the second measurement path and generating a corresponding measurement signal, the support device and the at least one workpiece comprising a reflectivity different from each other; and determining a position of the at least one workpiece based on the measurement signal. The reflected portion of the radiated measurement beam may in the following be denoted in short as “reflected radiation” or “reflected portion”. The method may be especially a welding method for connecting two workpieces.

The measurement beam may have any wavelength, especially a wavelength in the infrared range or in the visible green or blue range. Especially, the measurement beam may be a laser beam, for example, a laser beam stemming from the same laser source as a laser beam for machining the workpiece (also referred to as machining laser beam) or from of a pilot laser beam source, e.g., with a wavelength of about 630 nm or about 530 nm. Alternatively, the measurement beam may also comprise LED light or be generated by a LED, respectively. Preferably, at least part of a beam path of the measurement beam extends coaxially to the beam path of a machining laser beam in the laser machining process.

Determining the position may comprise at least one of the following: determining whether the workpiece or all workpieces, respectively, are present or are mounted or chucked in the support device, respectively, determining the position and/or the orientation of the at least one workpiece in one or both directions x and y substantially perpendicular to the measurement beam propagation direction or the optical axis of the laser machining apparatus (e.g., at the height of the exit of the measurement beam from the laser machining apparatus), respectively, presence of a gap or interval between two workpieces, respectively, size or width of the gap, respectively, etc. After determining the position, the laser machining process, e.g., laser cutting, welding, or soldering, on the at least one workpiece may occur. Thus, the method for determining a position of a workpiece may be carried out before a laser machining process, i.e., as a pre-process method. The information on the position of the at least one workpiece may, for example, be transferred to a scanning or deflection, respectively, unit of a laser machining apparatus, which subsequently sets, adjusts, or regulates a deflection or beam movement, respectively, of a machining laser beam in the subsequent material machining.

Alternatively or additionally, the method may also be carried out after the laser machining process, i.e., as a post-processing method, to obtain information on a size and/or position of the machining result, such as of a welding seam or welding dome, and/or on an interval between machining results, e.g., a creepage distance. If the established position or the established interval, respectively, deviates from a predetermined value, the machining result may be classified as “not okay”. Especially, in welding together hairpin pairs of a stator, the welding domes resulting thereby must have a minimum distance.

The measurement signal may correspond to a radiation intensity of the reflected portion of the radiated measurement beam. In other words, the measurement signal may be based on a measurement or detection of the radiation intensity of the reflect proportion. Thus, the radiated measurement beam and the reflected portion of the measurement beam acquired as a measurement signal may have the same wavelength. Measuring or detecting the radiation intensity of the reflected portion may occur by means of a photodiode. In this case, the measurement signal may be denoted as a photodiode signal. The measurement signal may correspond to a temporal progression of an output voltage of the photodiode. Therefore, the measurement signal may be a temporally variable voltage signal and especially an analog voltage signal. The measurement signal may be preprocessed according to embodiments for determining the position. Especially, the measurement signal may be smoothed and/or filtered. The measurement signal may, for example, be low-pass filtered or noise filtered. Further, the measurement signal may be converted to a digital voltage signal, comprising voltage values associated to points of time. Each point along the measurement paths may be a point of time of the course of the associated measurement signal. Therefore, each point along the respective measurement path is associated a value of the measurement signal. Thus, for each point of the respective measurement path, it is known, how large the acquired intensity of the reflected portion of the radiated measurement beam is.

The measurement beam may be radiated to a surface of the support device and a surface of the at least one workpiece, having different reflectivities. Especially, the surfaces of the support device and of the workpiece may comprise different reflectivities for the wavelength of the radiated measurement beam. For example, the measurement beam may be radiated to a surface of the support device, consisting of a first material, and on a surface of the at least one workpiece, consisting of a second material different from the first material. The first material may be or comprise aluminum, steel, or an alloy thereof. The second material may be or comprise copper or a copper alloy. Alternatively or additionally, the surface of the support device and the surface of the at least one workpiece may have different surface roughnesses. For example, the surface of the support device may consist of brushed, sandblasted, and/or matte metal, especially aluminum, and the surface of the workpiece may consist of smooth, glossy, or polished metal, especially copper. The surface of the workpiece may especially be a cut or milled metal surface. Of course, also the surface of the support device may consist of smooth, glossy, or polished metal and the surface of the workpiece may consist of brushed, sandblasted, and/or matte metal. Accordingly, an intensity of the portion reflected by the surface of the support device may be different from an intensity of the portion reflected by the surface of the workpiece. Correspondingly, the measurement signal may take on different values or levels, depending on whether the measurement beam was radiated to the corresponding place along the measurement path on the support device or on the workpiece.

The support device may surround the at least one workpiece at least partly or fully. For example, the support device may surround the at least one workpiece at least partly in a plane perpendicular to an optical axis of a laser machining apparatus radiating the machining laser beam or the measurement beam, especially a laser machining head. A surface of the support device, to which the measurement beam is radiated, may be planar or plane-parallel to the surface of the at least one workpiece to which the measurement beam is radiated. The support device may comprise a component and/or a component group. The at least one workpiece may be integrated in the component or the component group, respectively, or mounted thereon. For example, the support device may be a component to be welded with the workpiece. In another example, the support device may be a battery or a battery case, respectively, and the workpiece a deflector of the battery. The support device may additionally or alternatively comprise a jig for clamping the at least one workpiece, the component, and/or the component group.

An angle at which the measurement beam is radiated to the surface of the workpiece and/or the surface of the support device may be variable. For example, a stationary laser machining apparatus for machining a plurality of workpieces, which may also be arranged stationarily, comprises a deflection or scanner unit, respectively, with which the measurement beam and/or the machining laser beam is directed to the plurality of workpieces at different angles. The measurement beam may be radiated substantially perpendicularly to the surface of the workpiece and/or the surface of the support device. The portion of the measurement beam, reflected by the support device and the at least one workpiece, may be acquired substantially perpendicularly to the surface of the workpiece and/or the surface of the support device. The measurement beam may also be radiated obliquely to the surface of the workpiece and/or the surface of the support device. For example, the measurement beam may be radiated at an acute angle regarding the surface normal to the surface of the workpiece and/or the support device. The acute angle may be between 1° and 70°, or between 1° and 45°, preferably between 5° and 10°, to the surface normal. It is noted in this context that the reflection is not limited to a pure geometric reflection, but directed in a plurality of directions in space.

The second measurement path may have a predetermined angle to the first measurement path. At least one of the measurement paths may be linear or circular. The first measurement path may be circular or comprise a plurality of concentrical circular measurement paths. The second measurement path may be linear or comprise a plurality of linear measurement paths. The second measurement path may be arranged radially to a circular first measurement path. The measurement paths may be defined in a plane substantially perpendicular to the propagation direction of the (non-deflected) measurement beam or substantially perpendicular to the optical axis of laser machining apparatus radiating the measurement beam, respectively. The measurement path may correspond to a movement path of the measurement beam. The measurement beam may be deflected regarding the workpiece along the measurement paths either by movement of a laser machining head radiating the measurement beam or by a deflection unit. The at least one first measurement path and the at least one second measurement path may be part of a continuous and/or steady movement path of the measurement beam. In other words, the measurement beam between the measurement paths may remain turned on or does not need to be switched off between the individual measurement paths, respectively. The first measurement path and/or the second measurement path may each comprise a first area and a third area on the support device and a second area on the at least one workpiece, the second area arranged between the first area and the third area. In other words, the measurement beam may be radiated along an individual measurement path first to the support device, then to the workpiece, and subsequently to the support device again. Thus, the position and extension of the workpiece along this measurement path may be easily determined.

The at least one first measurement path and/or the at least one second measurement path may be a straight line or linear, respectively. Especially, the first measurement path and/or the second measurement path may be a straight line in a plane perpendicular to the propagation direction of the (non-deflected) measurement beam or perpendicular to an optical axis of the laser machining head radiating the measurement beam, respectively. The predetermined angle may substantially be an angle larger than 0°, especially an angle of about 90° or a right angle, respectively.

The method may preferably comprise the measurement beam being radiated along a plurality of first measurement paths extending parallel to each other and being spaced or offset, respectively, from each other and/or along a plurality of second measurement paths extending parallel to each other and being spaced or offset, respectively, from each other. In other words, the at least one first measurement path may comprise a plurality of first measurement paths offset in parallel to each other and/or the at least one second measurement path may comprise a plurality of second measurement paths offset in parallel to each other. Thereby, be the workpiece may be effectively scanned and a position of the workpiece may be determined comprehensively.

Determining the position of the at least one workpiece based on the measurement signal may comprise determining whether the measurement beam is reflected by the surface of the at least one workpiece at a point of the first measurement path and/or the second measurement path. In this course, it may be determined that the measurement beam is reflected at the point of the surface of the at least one workpiece when the measurement signal at the corresponding place or at the corresponding point of time, respectively, is equal to or larger or equal to or smaller, respectively, than a predetermined first value. The first value may be predetermined based on an average value of the portion reflected by the support device.

Determining the position of the at least one workpiece based on the measurement signal may comprise determining whether the at least one workpiece is present and/or is arranged in a predetermined position and/or is mounted or chucked in a predetermined orientation or at a predetermined position, respectively, in the support device. For example, it may be determined that the workpiece does not exist when the measurement signal has an average value of the portion reflected by the support device or a value lower than an average value of the portion reflected by the support device. Alternatively or additionally, it may be determined that the workpiece is not or at least not at a predetermined position mounted or chucked in the support device, when the measurement signal exceeds the predetermined first value only over a distance along the first measurement path and/or the second measurement path that is substantially smaller than a predetermined extension of the workpiece along the respective measurement path. In this case, an error are may be output, i.e., before the laser material machining begins.

In other words, the position of the at least one workpiece may comprise a position of the workpiece in a first direction (x) and/or in a second direction (y), and/or an extension of the workpiece in a first direction (x) and/or in a second direction (y), and/or an orientation of the at least one workpiece in a plane (x-y) defined by the first and second directions (x, y).

Preferably, in determining the position of the at least one workpiece, a focus diameter of the measurement beam or a diameter of the measurement beam or the spot, respectively, on the at least one workpiece and/or on the support device may be considered. The measurement beam radiated to the workpiece or the support device, respectively, generates, on the respective surface, a patch or spot with a certain diameter. In a case where therefore only parts of the spot fall on the workpiece or the support device, respectively, only these parts may be reflected. Thus, the measurement signal may comprise a ascending and/or descending slope. The ascending or descending slope, respectively, may correspond to the diameter of the measurement beam or the spot, respectively, on the at least one workpiece and/or on the support device. In order to determine the position of the at least one workpiece more exactly, an ascending slope and/or a descending slope of the measurement signal may be considered. In determining the position of the at least one workpiece, a predetermined focus diameter of the measurement beam may be considered an estimation of the diameter of the measurement beam or the spot, respectively, on the at least one workpiece and/or on the support device.

The measurement beam is preferably reflected essentially fully by the at least one workpiece. The measurement beam is preferably absorbed or diffusely scattered essentially fully by the support device. Thereby, whether the measurement beam was reflected by the workpiece or the support device may distinguished easily and unambiguously based on the measurement signal corresponding to the reflected portion of the measurement beam. In a case where the measurement beam is a laser beam, a power and/or a power density of the measurement beam may be selected correspondingly low and/or a diameter of the measurement beam correspondingly large and/or a movement speed of the measurement beam relative to the workpiece or along the measurement path, respectively, correspondingly high, so that the measurement beam is not coupled into the material of the workpiece or does not modify the workpiece, respectively. For example, the power of the measurement beam may be selected smaller than a laser power of the machining laser beam for machining the workpiece or the movement speed may be selected larger than a feed speed for machining the workpiece, respectively. In other words, a power density of the measurement beam on of a surface of the workpiece may be selected to be below a threshold at which the measurement beam is coupled into the workpieces or at which the workpiece melts, respectively.

The position of the at least one workpiece may comprise a position of the at least one workpiece in a first direction and/or in a second direction. The position of the at least one workpiece may comprise an extension of the at least one workpiece in a first direction and/or in a second direction. The position of the at least one workpiece may comprise an orientation of the at least one workpiece in a plane defined by a first and a second direction. If the at least one workpiece comprises two workpieces, determining the position of the at least one workpiece may comprise determining a presence and/or a position and/or an extension of the first workpiece in a first direction and/or in a second direction, and/or determining a presence and/or a position and/or an extension of the second workpiece in a first direction and/or in a second direction, and/or determining an interval between the first workpiece and the second workpiece in the plane defined by the first and second directions. The first direction and the second direction may be arranged perpendicularly to each other and/or may lie in a plane arranged perpendicular to the propagation direction of the measurement beam or perpendicular to an optical axis of the machining head radiating the measurement beam, respectively. The interval may be defined as the shortest interval between the workpieces.

The at least one workpiece may be a bar-shaped workpiece. The at least one bar-shaped workpiece may have at least one flat side or a plane area, respectively, and/or have a rectangular or square cross section or a rectangular or square cross section with rounded corners. For example, an end or a cross section of the workpiece may have a width (or a narrow side) between about 1 mm and about 2 mm and a length (or a longitudinal side) between 4 mm and 5 mm. The at least one workpiece may be or comprise an electrode, a bar-shaped electrode, a hairpin electrode, or a winding segment of a stator winding.

Preferably, at least one of the following parameters is known or predetermined, respectively: a shape and/or an extension (i.e., length and/or width) of a surface of the at least one workpiece, to which the measurement beam is radiated; a shape and/or an extension (i.e., length and/or width) of a through hole of the support device, in which the at least one workpiece is mounted or chucked; a reflectivity of the at least one workpiece and/or of the support device; and a number of the workpieces.

Preferably, e.g., for a laser welding process, a first workpiece and a second workpiece may be mounted or chucked in the support device. The method may comprise, in this case, determining the position of the first workpiece and the position of the second workpiece. The workpieces may be similar and/or have the same dimensions. The workpieces may be arranged parallel to each other in or on the support device, respectively. Ends or end surfaces, respectively, of the workpieces, to which the machining laser beam is radiated subsequently, may be arranged substantially planar or plane-parallel towards each other. In other words, a first workpiece and a second workpiece (n of the support device may be arranged such that the surfaces of the workpieces, to which the measurement beam is radiated, are arranged substantially planar or plane parallel.

The method may further comprise determining an interval or a size, respectively, of a gap between the two workpieces, especially in a plane perpendicular to the propagation direction of the measurement beam or perpendicular to an optical axis of the laser machining head radiating the measurement beam, respectively, based on the determined position of the first workpiece and the determined position of the second workpiece. A size or width of the gap, respectively, may correspond to the interval between the two workpieces. Alternatively or additionally, in determining the positions of the workpieces, also a position and/or a width or size, respectively, of the gap may be determined immediately from the measurement signal. Determining the interval of the workpieces may, for example, comprise determining a range of the measurement signal, in which the measurement signal is equal to or smaller than a predetermined second value.

According to a second aspect of the present invention, a method for machining a workpiece by means of a machining laser beam is given, the method comprising the following steps: determining a position of the workpiece by means of the method described above and radiating a machining laser beam to the workpiece for machining the workpiece.

The method for machining a workpiece may, for example, comprise laser welding, especially welding together two workpieces. For example, the machining laser beam may be radiated to the workpieces such that separate melting baths are formed on it. The separate melting baths subsequently merge to a common melting bath. After solidifying or cooling down, respectively, of the common melting bath, a conductive contact with low resistance exists between both workpieces.

The laser beam for machining the workpiece may stem from the same laser source as the measurement beam for determining the position of the workpiece. In other words, the laser beam for machining the workpiece and the measurement beam for determining the position of the workpiece may have the same wavelength. The laser beam for machining the workpiece may especially comprise a higher laser power than the laser beam for determining the position of the workpiece.

According to a further aspect of the present invention, a laser machining system for machining a workpiece by means of a machining laser beam is given, comprising: a laser machining apparatus for radiating a measurement beam and/or a machining laser beam to the workpiece; a sensor module with a photodiode for acquiring reflected radiation; and a control unit configured to perform the methods discussed above according to the first aspect or according to the second aspect.

The sensor module may be coupled to the laser machining apparatus. The laser machining apparatus may especially be a laser machining head. Here, a beam path of the reflected radiation to the sensor module or the photodiode, respectively, may lie fully outside the laser machining apparatus. Alternatively, a beam path of the reflected radiation to the sensor module or the photodiode, respectively, may lie partly in the laser machining apparatus or the laser machining head, respectively. In this case, the laser machining apparatus may comprise a beam splitter and an optical output for decoupling radiation from the beam path of the laser beam or from the laser machining apparatus, respectively. The sensor module may comprise an optical input for coupling in the radiation coupled out from the laser machining apparatus. The radiation may comprise the portion of the radiated measurement beam reflected by a workpiece. In another embodiment, the sensor module or at least a photodiode of the sensor module may be integrated in a laser source for the laser beam.

The sensor module comprises a photodiode for acquiring or detecting, respectively, a radiation intensity of the portion of the radiated measurement beam reflected by the workpiece. The photodiode may be configured to detect a radiation intensity in a predetermined wavelength range. The photodiode may have a spectral sensitivity in a wavelength range comprising the wavelength of the radiated measurement beam to detect back-reflections of the laser by the laser machining apparatus. The photodiode may have a maximum spectral sensitivity at the wavelength of the measurement beam. The photodiode may be configured to output a measurement signal based on the detection. The measurement signal may especially be an analog measurement signal, preferably an analog temporally variable voltage signal. Therefore, the measurement signal may be acquired by the described sensor module. The control unit may be configured to receive the analog measurement signal from the photodiode and convert it to a digital measurement signal.

The control unit may be configured to perform the methods according to the aspects described before. The control unit may be further configured to control a laser machining process, especially a laser welding or laser cutting process.

The laser machining apparatus may further comprise a deflection unit, e.g., a scanner unit or at least one galvano mirror, for deflecting the machining laser beam and/or for deflecting the measurement beam along the measurement paths. The deflection unit is preferably configured to a deflection in a direction perpendicular to the beam propagation direction or in a plane perpendicular to the beam propagation direction in two directions perpendicular to each other.

The measurement beam may have any wavelength, especially a wavelength in the infrared range or in the visible green or blue range. The laser machining system may comprise a laser source for the laser beam for machining the workpiece (also referred to as machining laser beam). The laser source may be configured to generate the measurement beam. In this case, the measurement beam may be a laser beam with lower power than the laser beam for material machining. The measurement beam may be a pilot laser beam. In this case, the laser machining system may comprise a pilot laser beam source, e.g., for generating a pilot laser beam with a wavelength of about 630 nm. Alternatively or additionally, the laser machining system may comprise a LED source for generating the measurement beam. The measurement beam generated by the LED source or the LED light, respectively, may, for example by means of a beam splitter, be coupled into a beam path of the machining laser or into the laser machining apparatus, respectively. Preferably, the measurement beam is coupled into the beam path of the laser machining apparatus in the measurement beam propagation direction before a deflection unit.

BRIEF DESCRIPTION OF THE DRAWINGS

Embodiments of the invention are described in detail in the following based on figures.

DETAILED DESCRIPTION OF THE INVENTION

In the following, the same reference signs are used for identical and similarly acting elements. In the present disclosure, x, y, and z directions are parallel to axes of an orthogonal or cartesian coordinate system. The z axis here corresponds to a propagation direction of the (non-deflected) measurement or laser beam, respectively, 14 or an optical axis of the laser machining apparatus 12, respectively. A plane spanned by the x direction and the y direction may be denoted as x-y plane. In the present detailed description, embodiments are described, in which the measurement beam 14 is a laser beam. The measurement beam 14 here may stem from a laser source for generating the machining laser beam or from a pilot laser source for generating a pilot laser beam. However, the disclosure is not limited thereto. Readily, the measurement beam 14 may stem from an LED source or a LED light, respectively, coupled into a machining laser beam path of the laser machining apparatus 12.

Figure 1:
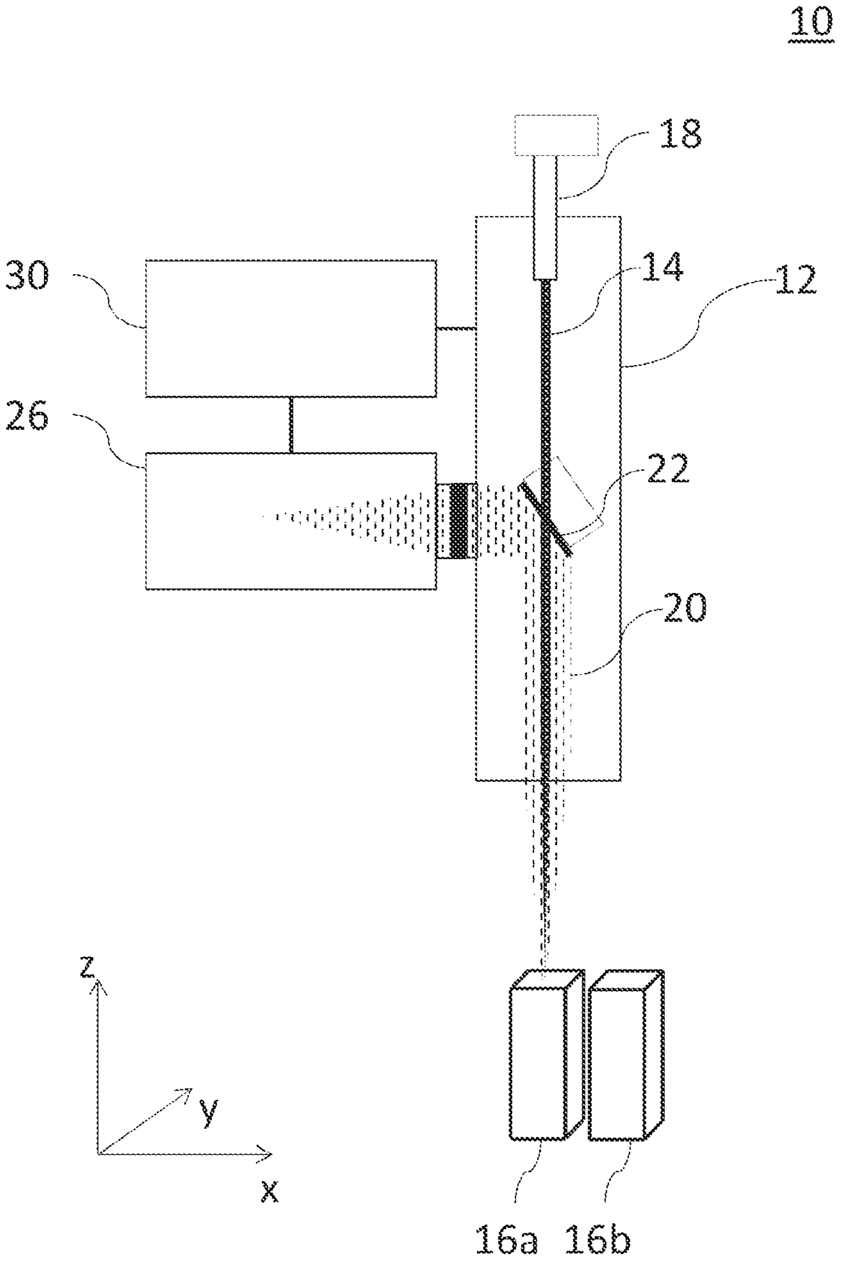
FIG. 1 shows a schematic view of a laser machining system for determining a position of a workpiece according to embodiments of the present invention.

FIG. 1 shows a schematic view of a laser machining system configured for determining a position of a workpiece according to embodiments of the present invention.

The laser machining system 10 for determining a position of a workpiece comprises a laser machining apparatus 12. The laser machining apparatus 12 may, for example, be formed as a laser machining head, especially a laser welding or laser cutting head. The laser machining apparatus 12 is configured to irradiate the measurement beam 14 exiting from one end of an optical fiber 18 or a laser source (not shown) with the help of a beam guiding and focusing optics (not shown) to workpieces to be machined 16*a*, 16*b* to thereby perform laser machining, especially laser welding. Especially, the measurement beam 14 may be focused or bundled on the workpieces 16*a*, 16*b* to locally heat the workpieces 16*a*, 16*b* for laser machining to the melting temperature. As shown in FIG. 1, a sensor module 26 is coupled to the laser machining apparatus 12 for acquiring a reflected portion of the measurement beam. In this example, parts of the beam paths of the laser machining apparatus 12 and of the sensor module 26 extend coaxially. However, the invention is not limited thereto.

In radiating the measurement beam 14 to the workpieces 16*a*, 16*b*, parts of the radiated measurement beam 14 are reflected by the workpieces 16*a*, 16*b*. The reflected measurement radiation 20 partly enters the laser machining apparatus 12 again and is there, for example, decoupled from a beam path of the measurement beam 14 by a beam splitter 22 and enters the sensor module 26 mounted to the laser machining apparatus 12. In the sensor module 26, the decoupled radiation 20 impinges on a detector (not shown).

According to other embodiments not shown, the reflected measurement radiation 20 does not re-enter the laser machining apparatus 12 before entering or being coupled, respectively, into the sensor module 26. In other words, the beam path for the reflected measurement radiation 20 extends fully outside the laser machining apparatus 12. Therefore, the measurement beam 14 is preferably directed to the workpieces 16*a*, 16*b* under an angle.

The detector is configured to detect radiation intensity in a predetermined wavelength range. Especially, the detector may exhibit spectral sensitivity in a wavelength range comprising the wavelength of the measurement beam 14. According to embodiments, the detector exhibits maximum spectral sensitivity at the wavelength of the measurement beam 14. The detector may be or comprise a photodiode or a photodiode array. The detector is also configured to detect an intensity of the reflected measurement radiation 20 and to output a measurement signal based on the detected intensity. The measurement signal may especially be an analog measurement signal, preferably an analog temporally variable voltage signal.

The laser machining system 10 further comprises a control unit 30. The control unit 30 is configured to receive the measurement signal. The control unit 30 may be configured according to embodiments to convert an analog measurement signal to a digital measurement signal. Therefore, the measurement signal may be acquired by the described sensor module 26. The control unit 30 and/or the sensor module 26 may be configured according to embodiments to record the measurement signal.

The measurement beam 14 is moved with regard to the workpiece surface. Therefore, the laser machining system 10, especially the laser machining apparatus 12, may comprise a deflection unit for deflecting the measurement beam with regard to the propagation direction of the measurement beam (e.g., scan optics). Alternatively or additionally, the laser machining apparatus 12 may be moved relative to the workpiece surface. In this case, the laser machining apparatus 12 may be a laser machining head with fixed optics. In order to radiate the measurement beam 14 always in a predetermined angle, e.g., substantially perpendicularly, to surfaces of the workpieces 16*a*, 16*b* and to always acquire the reflected radiation 20 in a predetermined angle, e.g., substantially in a direction perpendicular to the surfaces of the workpieces 16*a*, 16*b*, the laser machining apparatus 12 may be moved by means of a movement apparatus (not shown), e.g., a robot arm, in the three-dimensional space. For example, the laser machining apparatus 12 may be moved along the first direction x, the second direction y, and/or the third direction z. The z direction corresponds to a propagation direction of the measurement beam 14 or an optical axis of the laser machining apparatus 12, respectively, and may be arranged perpendicularly to a to machined surface of the workpieces 16*a*, 16*b*.

Figure 2:
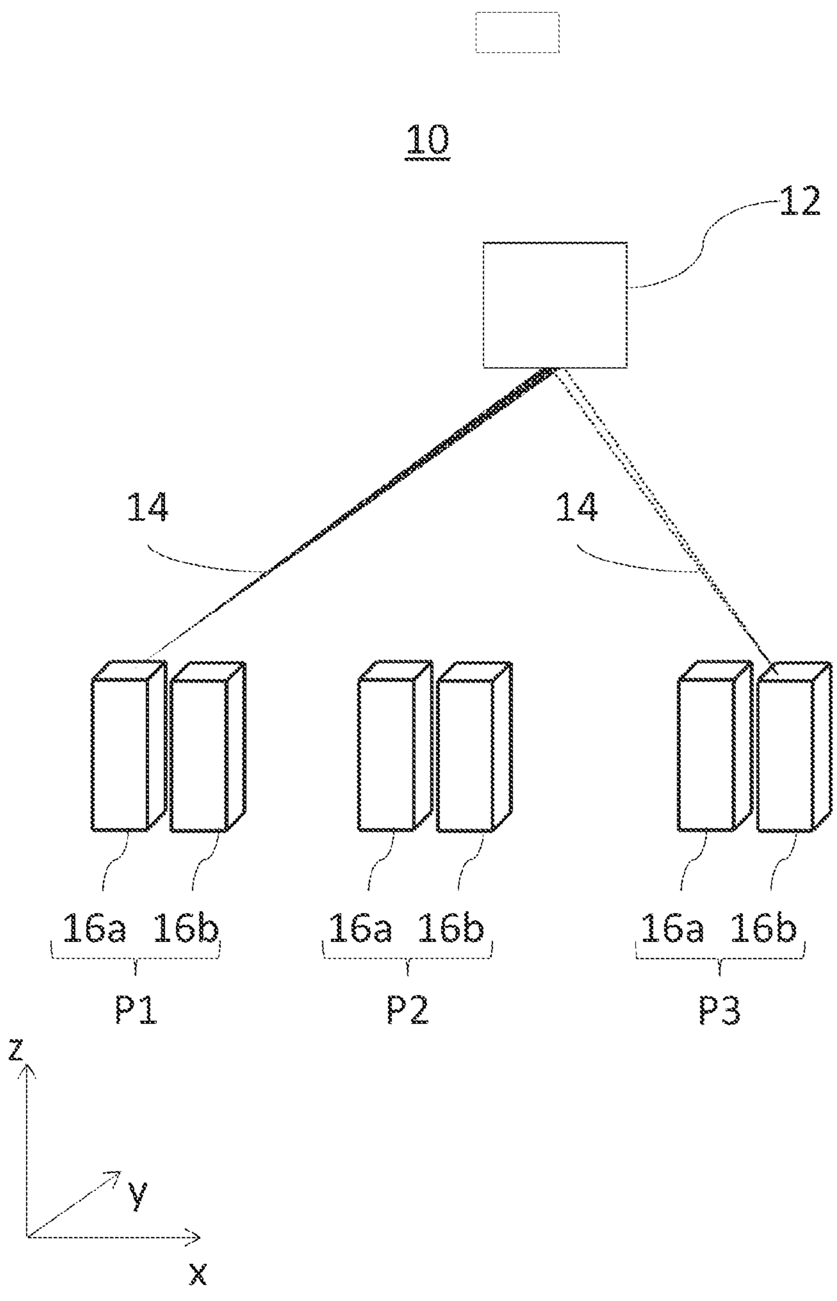
FIG. 2 shows a schematic view of a laser machining system for determining a position of a workpiece according to other embodiments of the present invention.

FIG. 2 shows a schematic view of a laser machining system for determining a position of a workpiece according to other embodiments of the present invention. FIG. 2 shows a laser machining system 10 with a laser machining apparatus 12 for machining a plurality of workpieces. The laser machining apparatus 12 comprises a deflection unit (not shown), e.g., a scanner unit, also referred to as scan optics, or a galvano mirror, for deflecting the measurement beam 14 and/or a machining laser beam in at least a direction perpendicular to the propagation direction of the measurement beam, to direct the measurement beam to three workpiece pairs P1, P2, and P3. By means of the deflection unit, the measurement beam 14 or the machining laser beam, respectively, may be radiated to the workpieces 16*a*, 16*b* of the workpiece pairs P1 to P3, without having to move the laser machining apparatus 12 or the workpiece pairs P1, P2, and P3 relative to each other. Thereby, the measurement beam 14 or the machining laser beam, respectively, may be radiated quickly to a plurality of workpieces 16*a*, 16*b* or workpiece pairs P1 to P3, respectively, arranged next to each other. The laser machining apparatus 12 may be stationary in conducting the method according to embodiments of the present invention.

In this case, the measurement beam is radiated obliquely to the surfaces of the workpieces 16*a*, 16*b* or the workpiece pairs P1 to P3, respectively, depending on the distance to the workpiece or the workpiece pair, respectively. For example, the measurement beam may be radiated under an acute angle to the surface normal to the surfaces of the workpieces 16*a*, 16*b* or workpiece pairs P1 to P3, respectively, the acute angle lying, for example, between 1° and 20° or between 5° and 10°. The angle may depend on the position of the workpieces 16*a*, 16*b* or the workpiece pairs P1 to P3, respectively, and of the laser machining apparatus 12.

The laser machining system 10 is configured to perform the method for determining a position of a workpiece described in the following and/or the method for machining a workpiece by means of a laser beam. Especially, be the control unit 30 may be configured to control the method for determining a position of a workpiece and/or the method for machining a workpiece. The laser machining system 10 is configured according to embodiments of the present invention to determine the positions of the workpieces 16*a*, 16*b*. According to embodiments, the positions of the workpieces 16*a*, 16*b* may comprise the positions of the workpieces 16*a*, 16*b* in x direction and/or y direction. Further, the positions of the workpieces 16*a*, 16*b* may comprise the extension of the workpieces 16*a*, 16*b* in the x-y plane, i.e., in the x direction and/or y direction. In addition, the positions of the workpieces 16*a*, 16*b* may comprise the orientation of the workpieces 16*a*, 16*b* in the x-y plane, especially a rotation of the workpieces 16*a*, 16*b* around the z direction. Further, with the method shown, an interval between the workpieces 16*a*, 16*b* in the x-y plane may be determined. The interval may be determined as the shortest interval between the workpieces 16*a*, 16*b*. According to embodiments, the control unit 30 is configured to control a radiation position and/or a movement speed and/or direction of the measurement beam 14 or the machining laser beam and/or a laser power of the machining laser beam for laser machining based on the determined position of the workpieces 16*a*, 16*b*.

Figure 3:
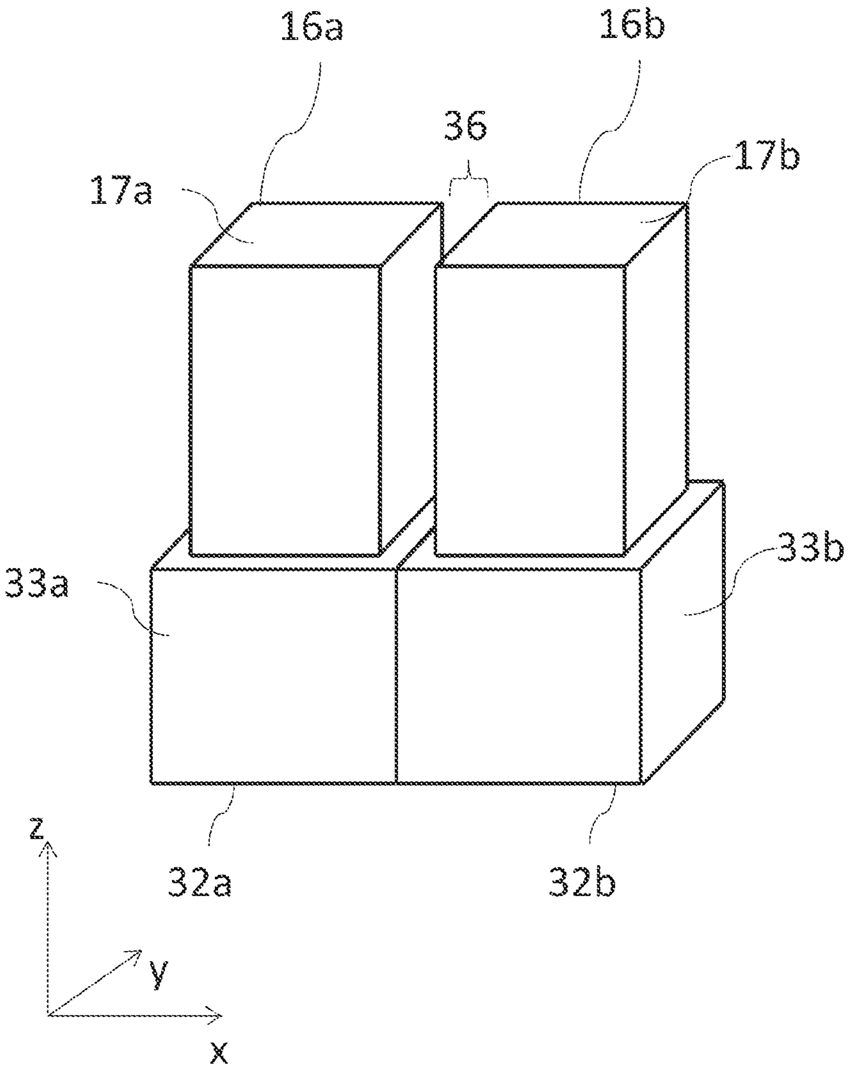
FIG. 3 shows a schematic view of workpieces for methods according to embodiments of the present invention.
Figure 5:
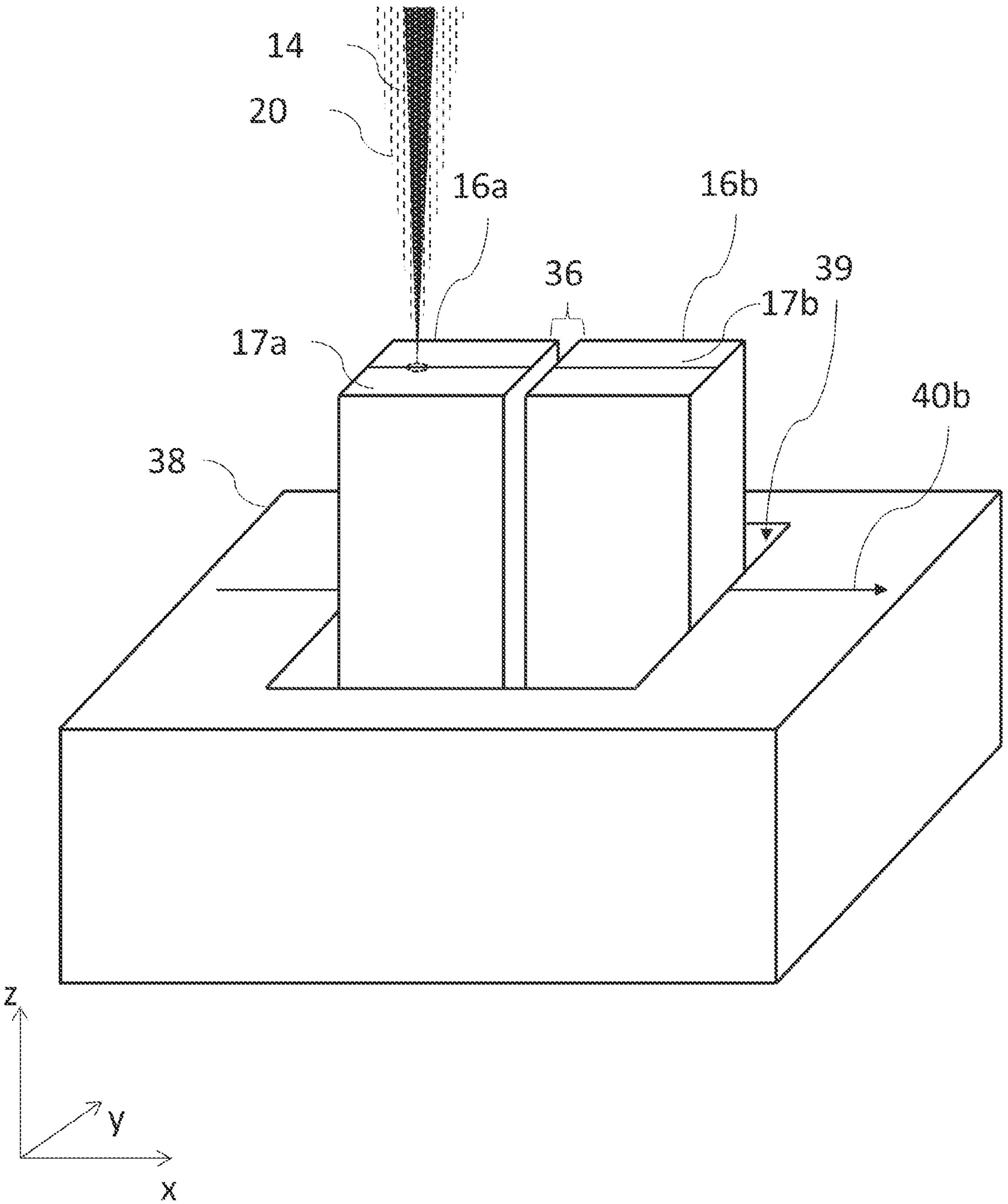
FIG. 5 shows a schematic perspective view of workpieces in a support device.

FIG. 3 shows a schematic view of workpieces for methods according to embodiments of the present invention. FIG. 5 shows a schematic view of the workpieces shown in FIG. 3 in a support device.

The invention is explained in the following by the example of two workpieces formed as bar-shaped electrodes. However, the invention is not limited thereto. The workpieces may also exist in a different number or have another shape.

The workpieces 16*a*, 16*b* are formed as two bar-shaped electrodes in FIG. 3. The bar-shaped electrodes exhibit a cuboid shape and have a rectangular cross section. The ends or end surfaces 17*a*, 17*b*, respectively, of the workpieces 16*a*, 16*b* are rectangular as well and comprise, according to embodiments, a width (or narrow side) between about 1 mm and about 2 mm and a length (or longitudinal side) between 4 mm and 5 mm. Both workpieces 16*a*, 16*b* may be similar and arranged parallel to each other, but the invention is not limited thereto. In FIG. 3, the ends 17*a*, 17*b* of the workpieces 16*a*, 16*b* are plane surfaces and arranged substantially in an x-y plane, but the invention is not limited thereto.

According to embodiments, of the invention, the workpieces 16*a*, 16*b* are formed as exposed ends 17*a*, 17*b* of electric conductors 32*a*, 32*b*, e.g., as hairpins or as winding segments of a stator coil for an electric motor. At the ends 17*a*, 17*b* of the electric conductors 32*a*, 32*b*, a coating or insulation material 33*a*, 33*b* has been removed, so that the end 17*a*, 17*b* is exposed. For example, the electric conductor 32*a*, 32*b* may be freed from coating 33*a*, 33*b* over of a length of 10 mm. If the conductors 32*a*, 32*b* are arranged next to each other in the support device, due to the insulation material 33*a*, 33*b*, a spacing or a gap 36, respectively, may exist between the workpieces 16*a*, 16*b*.

Figure 4:
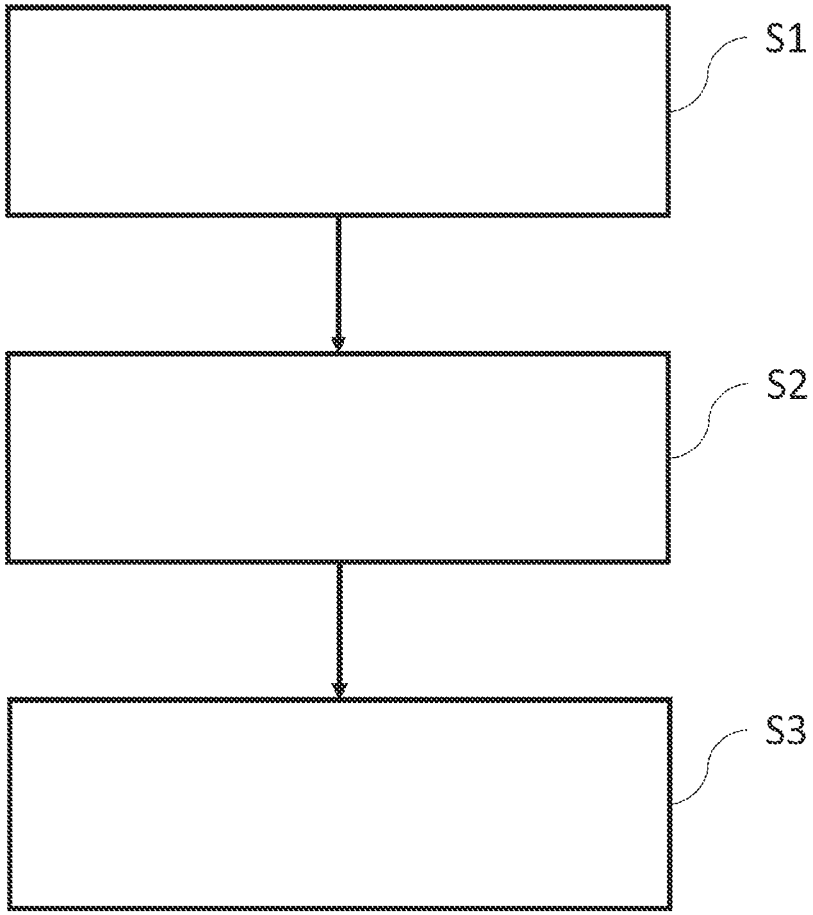
FIG. 4 shows a flow diagram of a method for determining a position of a workpiece according to embodiments of the present invention.

FIG. 4 shows a flow diagram of a method for determining a position of a workpiece according to embodiments of the present invention. With the method shown, for example, the positions of the workpieces 16*a*, 16*b* or workpiece pairs P1 to P3, respectively, shown in FIGS. 1 to 3 may be determined. According to embodiments, the positions of the workpieces 16*a*, 16*b* may comprise the positions of the workpieces 16*a*, 16*b* in x direction and/or y direction, i.e., in at least one direction perpendicular to the beam propagation direction. Further, the positions of the workpieces 16*a*, 16*b* may comprise an extension of the workpieces 16*a*, 16*b* in the x-y plane, i.e., a width in x direction and/or a length in y direction. In addition, the positions of the workpieces 16*a*, 16*b* may comprise the orientation of the workpieces 16*a*, 16*b* in the x-y plane, especially a rotation of the workpieces 16*a*, 16*b* around the z direction, i.e. the beam propagation direction. Further, with the method shown, the existence of the gap 36 and its size may be determined. The size of the gap 36 may be given as an interval of the workpieces 16*a*, 16*b* in the x-y plane. In case the gap 36 does not exist, the interval may be determined to "zero".

Figure 6:
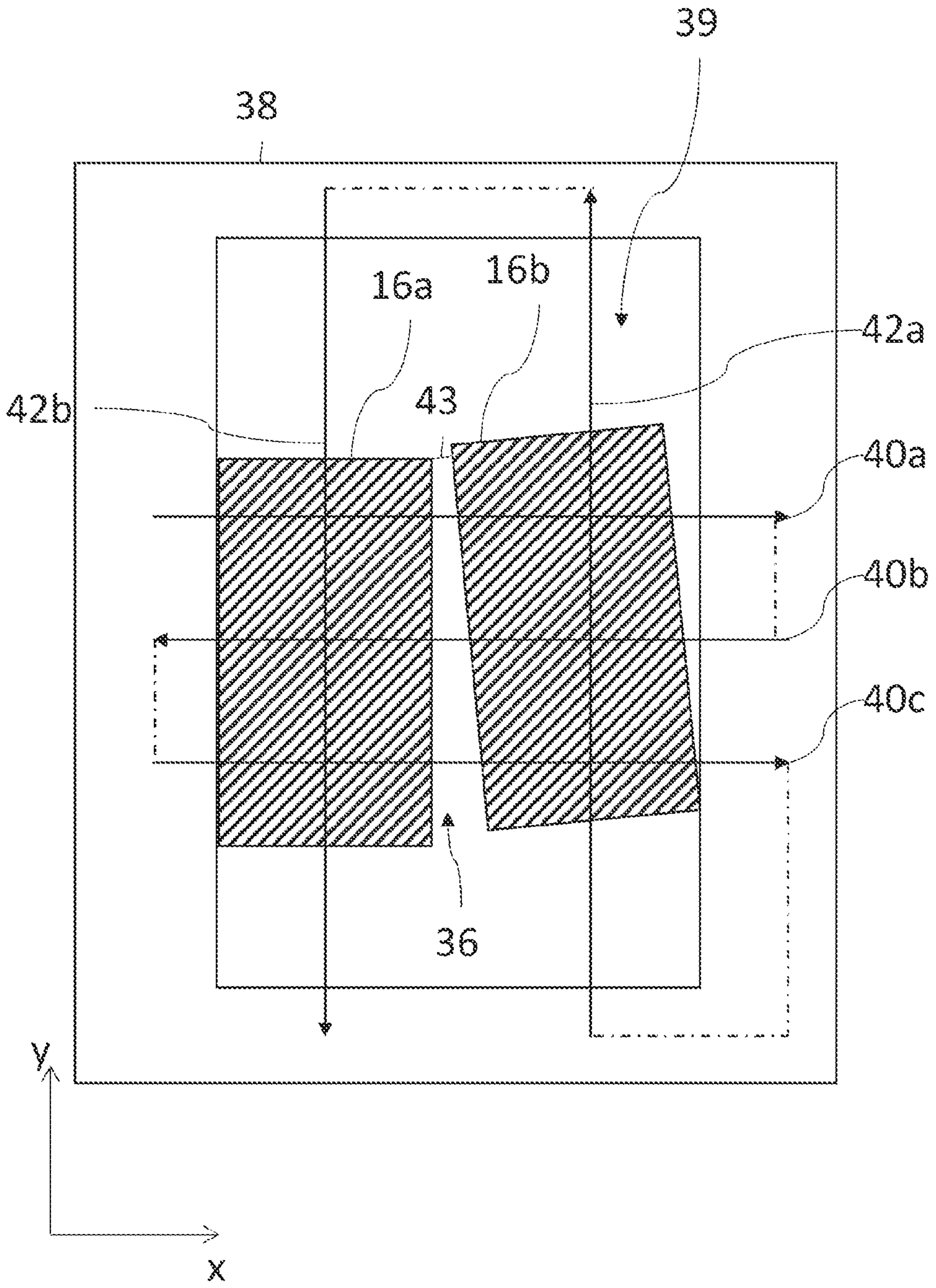
FIG. 6 shows the workpieces shown in FIG. 5 and the support device in a schematic top view for illustrating methods for determining a position of a workpiece according to embodiments of the present invention.

As illustrated in FIGS. 5 and 6, the method of the invention begins with radiating the measurement beam 14 (S1) to the workpieces 16*a*, 16*b* and a support device 38. The measurement beam 14 may be radiated along first measurement paths 40*a*, 40*b*, 40*c* offset parallel to each other and, subsequently, along second measurement paths 42*a*, 42*b* offset parallel to each other. The support device 38 surrounds the workpieces 16*a*, 16*b* at least partly. Preferably, the ends 17*a*, 17*b* or end surfaces, respectively, of the workpieces 16*a*, 16*b* may be arranged in a plane. As shown in FIGS. 5 and 6, the support device 38 may be formed as a jig and comprise a through hole 39 for feeding the workpieces 16*a*, 16*b* through, but the invention is not limited thereto. Another example can be found in the field of contacting batteries, especially in battery module manufacturing. Thereby, battery cells are connected to each other. The cell connectors lie on the battery cells and are welded onto the poles of the batteries. The position of the cell connectors may be recognized with the invention methods.

The support device 38 exhibits a reflectivity different from that of the workpieces 16*a*, 16*b*. Especially, the support device 38 and the workpieces 16*a*, 16*b* exhibit different reflection properties for light of the measurement beam 14. For example, the surfaces of the workpieces 16*a*, 16*b* consist of a different material than the surface of the support device 38. According to embodiments, the surfaces of the workpieces 16*a*, 16*b* consist of a metal, especially of copper, and the surface of the support device consists of a metal, especially of aluminum or steel. Additionally or alternatively, the surfaces of the support device 38 and the surfaces of the workpieces 16*a*, 16*b* may exhibit a roughness different from each other. For example, the surface of the support device 38 may be coarser than the surfaces of the workpieces 16*a*, 16*b*. Especially, the surface of the support device 38 may be matted, brushed or sandblasted and the surfaces of the workpieces 16*a*, 16*b* may be cut or milled surfaces.

The support device 38 may comprise a component and/or a component group, in which the at least one workpiece 16*a*, 16*b* is integrated or to which the at least one workpiece 16*a*, 16*b* is attached. The support device 38 may, for example, be a bottom plate and the workpiece 16*a*, 16*b* may be a top plate to be welded to the bottom plate. In another example in the field of battery contacting, the support device is a battery or a battery case, respectively, and the workpiece 16*a*, 16*b* is a deflector arranged on it. In the embodiments shown in FIGS. 5 and 6, the support device 38 may comprise a jig for clamping the at least one workpiece 16*a*, 16*b*, the other workpiece, the component, and/or the component group. The jig may serve to clamp the workpieces 16*a*, 16*b* for later laser machining. The clamping may comprise fixing or positioning the workpieces 16*a*, 16*b* in the jig, occurring before radiating the measurement beam for positioning. By clamping forces, a gap 36 between two workpieces 16*a*, 16*b* may be kept as small as possible.

Radiating the measurement beam 14 along the measurement paths occurs in this course with a very low laser power, e. g 240 W or less, and/or with a high speed, e. g 20 m/min or more. The laser power and/or the movement speed may be held constant while radiating the measurement beam 14 along the measurement paths. Therefore, the laser power or the movement speed, respectively, is selected such that the measurement beam 14 does not couple into the material of the workpieces 16*a*, 16*b*. In other words, a power density of the measurement beam 14 on of a surface of the workpieces 16*a*, 16*b* may be selected to be below a threshold at which the measurement beam 14 couples into the workpieces 16*a*, 16*b* or at which the workpieces 16*a*, 16*b* melt.

Figure 7:
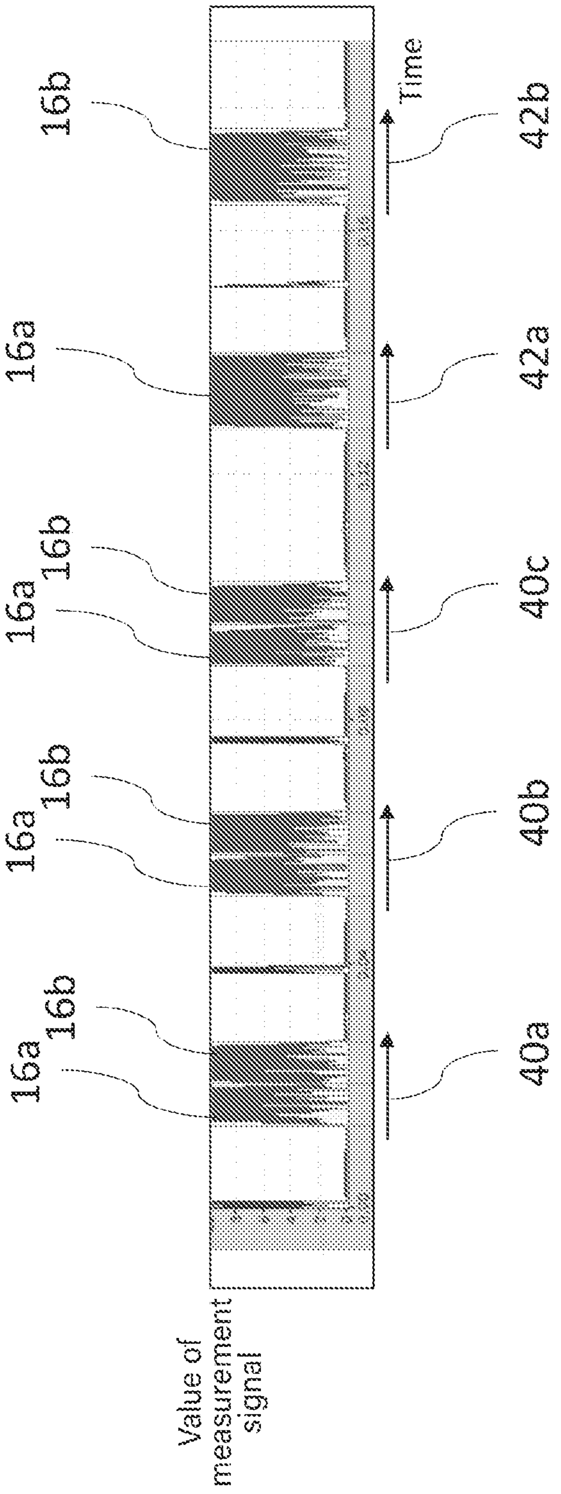
FIG. 7 shows exemplarily the progression of a measurement signal acquired by a method for determining a position of a workpiece according to embodiments of the present invention.

The intensity of a portion 20 of the radiated measurement beam 14 reflected by the workpieces 16*a*, 16*b* and the support device 38 along the respective measurement path 40*a*, 40*b*, 40*c*, 42*a*, 42*b* is acquired or recorded, respectively, in step S2 and a corresponding measurement signal is generated. According to embodiments, the measurement signal is a temporally variable voltage signal of a photodiode, as depicted in FIG. 7. According to embodiments, this measurement signal may be preprocessed. Especially, the measurement signal may be converted to a digital voltage signal comprising voltage values associated to points of time. Further, the measurement signal may be smoothed and/or filtered. The measurement signal may, for example, be low-pass filtered or noise filtered.

In the next step S3, determining a position of the workpieces 16*a*, 16*b* occurs based on the measurement signal. To do so, the measurement signal may be evaluated. Determining the positions of the workpieces 16*a*, 16*b* is based on the finding that the workpieces 16*a*, 16*b* and the support device 38 exhibit different reflection behavior. For example, the measurement beam 14 may be reflected strongly by the workpieces 16*a*, 16*b*, so that the measurement signal takes on a relatively higher value, while the measurement beam 14 may be strongly absorbed or scattered by the support device 38, so that the reflected portion 20 of the measurement beam 14 is very low and the measurement signal takes on a relatively smaller value. In a case where the measurement beam 14 along the measurement paths 40*a*, 40*b*, 40*c*, 42*a*, 42*b* hits the through hole 39 or the gap 36, respectively, also no reflection may occur, so that no reflected portion 20 be acquired and the measurement signal also takes on a very small value or even the value "zero". Through the different reflection behavior, for example due to differences in material and surface roughness, the quantity of the back-scattered light is strongly different and clear signal differences result depending on the position of the measurement beam 14. Therefore, by evaluating the measurement signal, it may be determined where along the measurement paths the measurement beam 14 was radiated onto the support device 38, one of the workpieces 16*a*, 16*b*, or to the through hole 39 or the gap 36, respectively.

According to embodiments, a method for machining the workpieces 16*a*, 16*b* with a measurement beam may comprise the method for determining the positions of the workpieces 16*a*, 16*b* described with regard to FIG. 4, and subsequently radiating the machining laser beam to the workpieces 16*a*, 16*b* for machining the workpieces 16*a*, 16*b*. For machining the workpieces 16*a*, 16*b*, the machining laser beam may have a higher laser power than the measurement beam 14 for determining the positions of the workpieces 16*a*, 16*b*. However, the measurement beam 14 and the machining laser beam may be provided by the same laser source (not shown). Alternatively, the measurement beam 14 may also be provided by a pilot laser beam source or a LED source. The laser machining may, for example, comprise laser welding, especially welding together the workpieces 16*a*, 16*b*. For example, the laser beam may be radiated to the end surfaces 17*a*, 17*b* of the workpieces 16*a*, 16*b* such that separate melting baths are formed on it. The separate melting baths subsequently merge to a common melting bath. After solidifying or cooling down, respectively, of the common melting bath, a conductive contact with low resistance exists between both workpieces 16*a*, 16*b*. By exact knowledge of the position of the workpieces 16*a*, 16*b* or the size of the gap 36 between the workpieces 16*a*, 16*b*, respectively, the laser machining may be controlled accordingly. Thereby, the quality of the welding joint between the workpieces 16*a*, 16*b* may be increased.

FIG. 5 shows a schematic perspective view of workpieces 16*a*, 16*b* in the support device 38 with an individual measurement path 40*b*, and FIG. 6 shows a schematic top view of the workpieces 16*a*, 16*b* and the support device 38 for illustrating measurement paths 40*a*, 40*b*, 40*c*, 42*a*, 42*c* for methods according to embodiments of the present invention. The top view of FIG. 6 is parallel to the x-y plane, in which the workpiece surfaces are arranged in this example. Even though the measurement beam in FIGS. 5 and 6 is shown in z direction, the present invention is not limited thereto. The measurement beam 14 may also impinge on the workpiece surfaces at an acute angle, as illustrated in FIG. 2.

The measurement beam 14 radiated to the workpieces 16*a*, 16*b*, or the support device 38, respectively, generates a patch or a spot on the respective surface. The first measurement paths 40*a*, 40*b*, 40*c* and the second measurement paths 42*a*, 42*b*, which are also referred to as "traverses", may each be defined as a projection of these spots on the x-y plane or, respectively, a plane perpendicular to the optical axis of the laser machining apparatus 12 or the propagation direction of the measurement beam 14, respectively.

According to embodiments, the measurement paths 40*a*, 40*b*, 40*c*, 42*a*, 42*b* are each formed as a straight line, but the invention is not limited thereto. Especially in a plane perpendicular to the beam propagation direction, i.e., in the x-y plane, the measurement paths are preferably linear. The first measurement paths 40*a*, 40*b*, 40*c* are respectively arranged parallel or antiparallel to each other in the x direction and the second measurement paths 42*a*, 42*b* are respectively arranged parallel or antiparallel to each other in the y direction, but the invention is not limited thereto. As shown, the first measurement paths 40*a*, 40*b*, 40*c* and the second measurement paths 42*a*, 42*b* are arranged in a predetermined angle to each other, the predetermined angle being 90°, but the invention is not limited thereto.

The first measurement paths 40*a*, 40*b*, 40*c* and the second measurement paths 42*a*, 42*b* may be part of a continuous and/or steady movement path of the measurement beam 14 or the spot, respectively, as illustrated in FIG. 6 by the dashed line between the first measurement path 40*c* and the second measurement path 42*a*. In other words, the measurement beam 14 musts not be turned off between the individual measurement paths. Accordingly, the measurement signal may be recorded continuously. Accordingly, the measurement signal may comprise the acquired intensity of the reflected measurement radiation 20 for all measurement paths 40*a*, 40*b*, 40*c*, 42*a*, 42*b*. However, the invention is not limited thereto. For example, individual measurement signals may be acquired also for each of the measurement paths 40*a*, 40*b*, 40*c*, 42*a*, 42*b*. Alternatively, the measurement paths 40*a*, 40*b*, 40*c* may, for example, respectively extend in x direction and the measurement paths 42*a*, 42*b* may, for example, respectively extend in y direction. In this case, the measurement beam 14 may be turned off between the individual measurement paths.

Each measurement path may comprise areas on the support device 38, the through hole 39, the gap 36, and at least one of the workpieces 16*a*, 16*b*. In other words, the measurement beam 14 may traverse, along the first measurement paths 40*a*, 40*b*, 40*c* and/or the second measurement paths 42*a*, 42*b*, the support device 38, the through hole 39, the gap 36, and at least one of the workpieces 16*a*, 16*b*. As shown in FIG. 6, for example, the first measurement paths 40*a*, 40*b*, 40*c* each comprise a first area on the support device 38, a second area on the workpiece 16*a*, a third area in the gap 36, a fourth area on the workpiece 16*b*, and a fifth area on the support device 38, the first to fifth areas arranged in this order along the first measurement paths 40*a*, 40*b*, 40*c*. Further, the second measurement paths 42*a*, 42*b* each comprise a first area on the support device 38, a second area in the through hole 39, a third area on the workpiece 16*a* or 16*b*, respectively, a fourth area in the through hole 39, and a fifth area on the support device 38, the first to fifth areas arranged in this order along the second measurement paths 42*a*, 42*b*. In other words, the measurement beam 14 may be radiated along the measurement paths 42*a*, 42*b* initially to the support device 38, the through hole 39, then to the workpiece 16*a* or 16*b*, respectively, and subsequently to the through hole 39 and the support device 38 again.

By means of the first measurement paths 40*a*, 40*b*, 40*c* and second measurement paths 42*a*, 42*b* shown in FIG. 6, the positions and extensions of the workpieces 16*a*, 16*b* and the size of the gap 36 may be comprehensively, unambiguously, and easily determined and quantified, respectively.

For an unambiguous determination of the position and extension of the workpieces 16*a*, 16*b* and of the size of the gap 36, the measurement path 40*c* is not required. The measurement path 40*c* or other measurement paths, respectively, may be used for increasing the accuracy.

Figure 8:
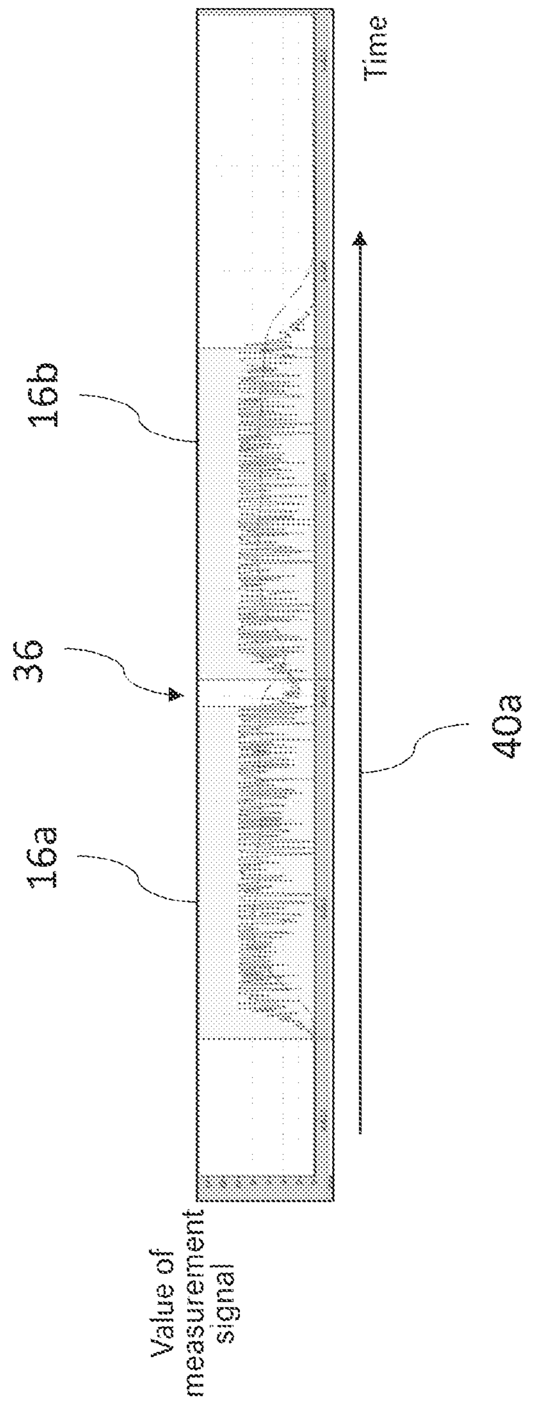
FIGS. 8 and 9 show cutouts from progression shown in FIG. 7.
Figure 9:
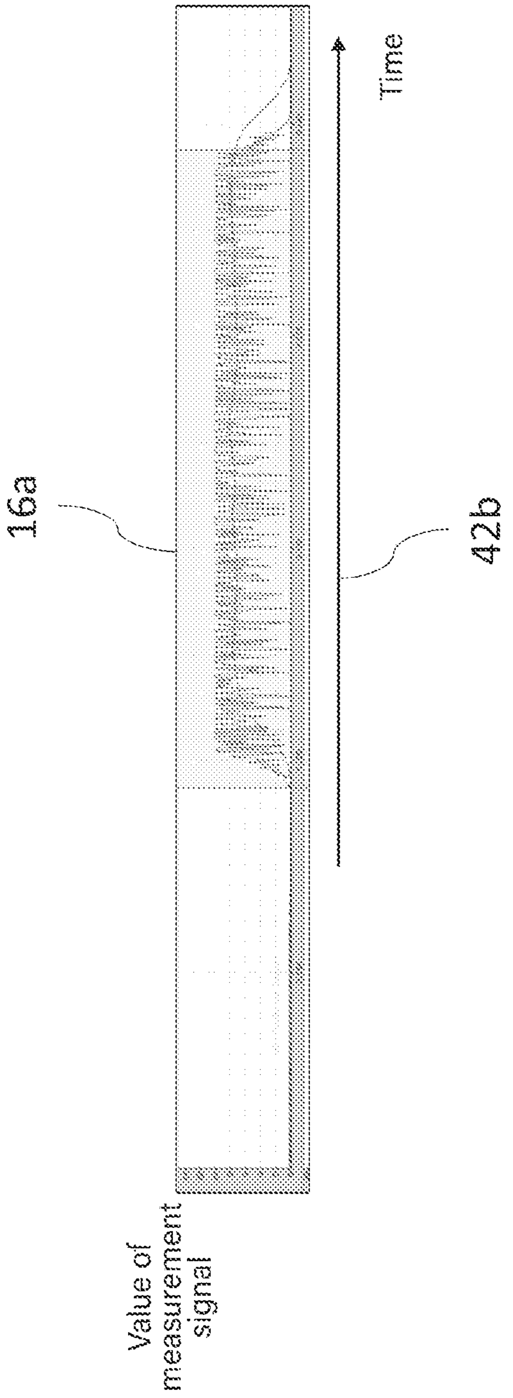

FIG. 7 exemplarily shows the progression of a measurement signal acquired by a method for determining a position of a workpiece according to embodiments of the present invention. FIGS. 8 and 9 show cutouts from the progression shown in FIG. 7. The progression of the measurement signal may also be referred to as a "measurement curve". As shown in FIGS. 7 to 9, the acquired measurement signal comprises the acquired intensity of the reflected measurement radiation 20 for all measurement paths 40*a*, 40*b*, 40*c*, 42*a*, 42*b*.

According to embodiments, the measurement signal corresponds to a temporally variable voltage signal of a photodiode or the temporally variable output voltage of a photodiode, respectively.

As shown in FIGS. 7 to 9, every range of the measurement signal corresponds to one of the measurement paths 40*a*, 40*b*, 40*c*, 42*a*, 42*b*. In other words, each point along the measurement paths 40*a*, 40*b*, 40*c* 42*a*, 42*b* may be associated to a point of time of the progression of the measurement signal shown in FIGS. 7 to 9. Therefore, a value of the measurement signal is associated to each point along the respective measurement path 40*a*, 40*b*, 40*c*, 42*a*, 42*b*. Thus, for each point of the respective measurement path 40*a*, 40*b*, 40*c*, 42*a*, 42*b*, it is known how large the acquired intensity of the reflected portion 20 of the radiated measurement beam 14 is. This is possible, for example, when the measurement paths 40*a*, 40*b*, 40*c*, 42*a*, 42*b* at each point of time, at which the measurement signal is acquired, are known.

As shown in FIGS. 7 to 9, the workpieces 16*a*, 16*b* were traversed a total of five times along the measurement paths 40*a*, 40*b*, 40*c*, 42*a*, 42*b* and the reflected measurement radiation 20 was acquired to obtain the shown measurement signal. FIG. 7 shows the acquired raw measurement signal and FIGS. 8 and 9 show cutouts of the acquired raw measurement signal and of the corresponding low-pass filtered measurement signal, wherein in FIG. 8, the measurement signal along a first measurement path 40*a* is depicted, and in FIG. 9, the measurement signal along a second measurement path 42*b* is depicted. Alternatively to the raw measurement signal, also the noise of the measurement signal may be evaluated.

As described before with respect to the method of the invention, the acquired measurement signal corresponds to the acquired intensity of the reflected measurement radiation 20 along the measurement paths 40*a*, 40*b*, 40*c*, 42*a*, 42*b*.

By evaluating the measurement signal, it may be determined, for example, whether the measurement beam 14 at a corresponding point along one of the measurement paths 40*a*, 40*b*, 40*c*, 42*a*, 42*b* was directed to one of the workpieces 16*a*, 16*b*, the support device 38, the through hole 39 or the gap 36, respectively. The positions of the workpieces 16*a*, 16*b* and the size of the gap 36, described before regarding the method of the invention, may also be determined by evaluating the strength of the measurement signal along the measurement paths 40*a*, 40*b*, 40*c*, 42*a*, 42*b*.

The acquired measurement signal may, for example, be evaluated as to whether or how strong, respectively, the measurement beam 14 was reflected along the measurement paths 40*a*, 40*b*, 40*c*, 42*a*, 42*b* of the workpieces 16*a* or 16*b*, respectively. For example, it may be determined that the measurement beam 14 along the corresponding measurement path 40*a*, 40*b*, 40*c*, 42*a*, 42*b* of the surface of one of the workpieces 16*a* or 16*b*, respectively, was reflected, when the measurement signal at the corresponding point of time or the corresponding place, respectively, is equal to or larger than a predetermined first value. Therefore, it may be determined that the workpiece 16*a*, 16*b* existed the corresponding point along the measurement path 40*a*, 40*b*, 40*c*, 42*a*, 42*b*. Similarly, it may be determined that the measurement beam 14 along the corresponding measurement path 40*a*, 40*b*, 40*c*, 42*a*, 42*b* was not reflected by the surface of one of the workpieces 16*a* or 16*b*, respectively, when the measurement signal at the corresponding point of time or the corresponding place, respectively, is equal to or smaller than a predetermined second value. In this case, no workpiece existed at the corresponding point along the measurement path 40*a*, 40*b*, 40*c* 42*a*, 42*b*. In FIGS. 7 to 9, the ranges of the measurement signal, for which the existence of the workpieces 16*a*, 16*b* was determined, were highlighted. Since the position, shape, and orientation of the measurement paths 40*a*, 40*b*, 40*c*, 42*a*, 42*c* is known, thus, the position and/or orientation of the workpieces 16*a*, 16*b* in the x-y plane may be inferred. By evaluating the measurement signal along the measurement paths 40*a*, 40*b*, 40*c* 42*a*, 42*b*, the positions of the workpieces 16*a*, 16*b* may therefore be determined unambiguously and comprehensively.

By evaluating the measurement signal along the measurement paths 40*a*, 40*b*, 40*c*, 42*a*, 42*b*, the interval 43 between the workpieces 16*a*, 16*b*, i.e., the size of the gap 36, may be determined as well. Since the first measurement paths 40*a*, 40*b*, 40*c* are arranged parallel to the x direction, the interval 43 between the workpieces 16*a*, 16*b* in the x direction may, for example, be determined based on the interval of the ranges of the measurement signal in FIG. 8 highlighted in gray. According to other embodiments, the interval 43 between the workpieces 16*a*, 16*b* may, with knowledge of the position and/or orientation of the workpieces 16*a*, 16*b*, be also determined computationally in the x-y plane. As illustrated in FIG. 6, the interval 43 between the workpieces 16*a*, 16*b* may be defined as the shortest interval between the workpiece surfaces or as the shortest interval between the workpieces 16*a*, 16*b* in the x-y plane, respectively.

By evaluating the measurement signal, it may be also determined whether the workpiece 16*a* and/or the workpiece 16*b* exists at all and/or is mounted or chucked in the support device 38 in a predetermined position or orientation, respectively. For example, it may be determined that the workpieces 16*a*, 16*b* do not exist at all, when the measurement signal does not exceed the first value described before. Summarizing, it may be determined that the workpieces 16*a*, 16*b* do not exist or do not exist in a predetermined position or orientation, when the measurement comprises signal unplausible or unexpected values. In these cases, according to embodiments, an error may be output.

In evaluating the measurement signal, for precisely determining the positions of the workpieces 16*a*, 16*b*, the diameter of the measurement beam 14 on the workpieces 16*a*, 16*b* and/or on the support device 38, also referred to as spot diameter, may be taken into account. In the exemplary course of the measurement signal according to embodiments of the present invention shown in FIGS. 7 to 9, the spot diameter was 340 μm (200 μm fiber diameter×255/150). For example, in FIG. 8, showing the measurement signal for the measurement path 40*a*, it is considered for the evaluation of the measurement signal and for the determination of the position of the workpieces 16*a*, 16*b* that, at the start of a rise of the measurement signal (the rising slope), the spot of the measurement beam 14 still lies to 0% on the workpiece 16*a* and is only tangent to the workpiece 16*a*, and that at the start of a drop of the measurement signal (the descending slope) the spot still lies to 100% on the workpiece 16*b* and is only tangent to the edge of the workpiece 16*b*. Correspondingly, the measurement signal is classified as workpiece area from the start of the rising slope to the start of the falling slope. Further, it is to be considered that a low-pass filtered measurement signal and/or a measurement signal evaluated with a noise filter is temporally shifted against the raw measurement signal.

The present invention relates to the recognition of a position of workpieces for later laser machining the same based on reflected measurement radiation or based on measurement signals, especially on photodiode signals, respectively. To do so, a measurement beam with very lower power and/or speed is guided over the workpieces, e.g., i-pins or hairpins, and a support device surrounding the workpieces and the back-reflected or back-scattered proportion of the measurement beam is, for example, captured and evaluated with a photodiode. In the area of the hairpins, the measurement radiation is strongly reflected and the back-reflection signal shows pronounced amplitudes. In the area of the support device, the laser power is absorbed and the back-scattered light is very low. By evaluating the measurement signal or the photodiode signal, respectively, it is therefore possible to determine whether the workpieces exist at all, what the position of the workpieces is, and how large a gap between the workpieces is.

Above, an application of the present invention was described, in which a component position of two workpieces to be machined is detected before the machining process, for example by guiding a pilot laser over the workpieces and evaluating the photodiode signals. Especially, this was explained by the example of two pins to be welded before a welding process.

However, the present invention may also be applied post-process, i.e., after the machining process, to evaluate the machining result. For example, the method of the invention may be applied after a welding process for welding together pins, to determine intervals between the individual welding domes and/or a size or a diameter, respectively, of a welding dome. In welding together pins of a stator, for example, a minimum creepage distance not to be gone below may be predetermined. Typically, creepage distances between welding domes should be >3 mm. Should these distances be <3 mm, the component is usually scrap.

Figure 10:
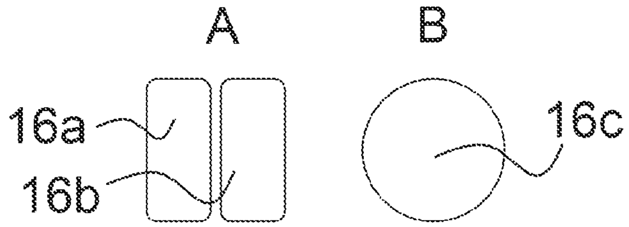
FIG. 10 shows an unprocessed workpiece in the state before a laser machining process and a machined workpiece after a laser machining process.

FIG. 10 shows in subfigure A two unprocessed individual workpieces 16*a* and 16*b*, for example, a pin pair (two pins) in the state before a laser machining process. In subfigure B, the welded pin pair or the generated welding dome 16*c*, respectively, is illustrated schematically. In welding together both pins 16*a*, 16*b*, a welding dome or -seam, respectively, 16*c* is formed. The welding dome 16*c* has a circular shape in the schematic depiction. The individual pins 16*a*, 16*b* show a substantially elongated shape. However, each different thinkable shape is possible as well, respectively. Thus, subfigure A illustrates the state before the laser machining, that is, the pre-process state, and subfigure B illustrates the state after the laser machining, that is, the post-process state.

Figure 11:
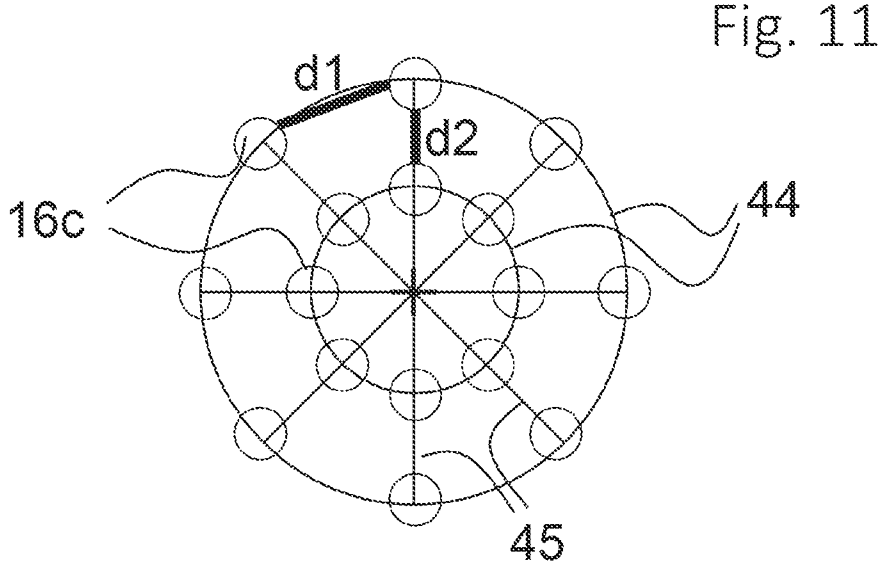
FIG. 11 shows a circular and concentrical arrangement of machined workpieces and a measurement path for determining positions of the machined workpieces and/or of intervals between the machined workpieces.

FIG. 11 shows a circular and concentrical arrangement of machined workpieces, e.g., of a plurality of welding domes 16*c* of a stator, and a measurement path 44, 45 for determining positions of the machined workpieces and/or of intervals d1, d2 between the machined workpieces 16*c*. Thus, this is a post-processing analysis, especially a quality check of components with welded pins. The machined workpieces presently correspond to welding domes 16*c* formed between the welded pins 16*a*, 16*b*. In a stator, these welding domes 16*c* may be arranged circularly and concentrically, as shown in FIG. 11. The welding domes 16*c* in FIG. 11 form, exemplary, two circular arrangements, an inner and an outer circular arrangement with eight welding domes 16*c* each. However, arrangements with more than two circular arrangements, for example three, four, five, or more, are thinkable as well.

The distance d1 may be acquired or established substantially along a first measurement path 44. In FIG. 11, first measurement paths are indicated along the circular arrangement of the welding domes 16*c*, respectively. In other words, a first measurement path 44 extends along a circular arrangement, namely such that it cuts or traverses, respectively, two adjacent welding domes 16*c* on a circular arrangement. The first measurement path 44 may, for example, lie on an almost perfect or also a only approximately circular track. An approximately circular track may comprise linear track sections, which connect points on a circular path.

The distance d2 between two adjacent welding domes 16*c*, which lie on different circular arrangements (on an inner and an outer circle, respectively), may, for example, be acquired along a linear second measurement path 45. In FIG. 11, second measurement paths 45 are indicated, each crossing two adjacent welding domes 16*c* on an inner and an outer circular arrangement and the respective opposite adjacent welding domes 16*c*. In other words, the second measurement paths 45 in FIG. 11 each form linear cutting lines leading radially through the circular arrangements of the welding domes 16*c*, namely through the respective welding domes 16*c* positioned on the inner and outer circular arrangements.

In the present example in FIG. 11, two circular paths as well as a linear horizontal track and a linear vertical track are traced or passed through, respectively, by a laser. Further, two linear tracks are traced, each tilted by 45° towards the linear horizontal track and the linear vertical track. The linear tracks, corresponding in FIG. 11 to the second measurement paths 45, extend radial, i.e., through the center of the circular arrangements. Depending on the stator type, such an arrangement may also comprise more than two circular arrangements and/or more or less welding domes 16*c*. Therefore, correspondingly more or less first measurement paths 44 and correspondingly more or less second measurement paths 45 of the laser may be traced. For example, two, three, four, five, or more first measurement paths 44 may be traced, especially when two, three, four, five, or more circular arrangements exist, respectively.

Since each circular arrangement in FIG. 11 comprises eight welding domes 16*c*, four continuous second measurement paths 45 are traced. The welding domes 16*c* on a circular arrangement lie opposite to each other and, therefore, the second measurement paths 45 of FIG. 11 substantially fully pass the circular arrangements. There may alternatively also exist a circular arrangement, in which the welding domes 16*c* are arranged not mirror-symmetrically, so that they do not exhibit an opposite neighbor on the circular arrangement. In this case, a second measurement path 45 may pass through the circular arrangement, if only partly, so that one or more welding domes 16 on one side of the respective circular arrangement are intersected along a linear track, wherein the linear track does not extend beyond the center the circular arrangements to the other or opposite, respectively, side of the circular arrangements. Preferably, however, the second measurement paths 45 intersect or pass through, respectively, the circular arrangements substantially fully.

The first measurement paths and the second measurement paths preferably extend such that the welding domes 16*c* are intersected or passed through, respectively, substantially centrally by the measurement paths, as for example indicated in FIG. 11. In practice, the relevant measurement paths 44, 45 or tracks, respectively, may be traced by means of a pilot laser.

The "tracing the tracks" means that e.g., the laser beam of a pilot laser is deflected by mirrors, especially by galvano mirrors, of the scanner optics and the light spot thus carries out or passes through, respectively, tracks on the component. The sensor module, especially a laser welding monitoring sensor (short: LWM sensor) based on photodiodes, registers the back-scattered laser light, and may thus determine or acquire the positions of the welding domes.

If laser light hits a position where no workpiece 16*a*, 16*b*, 16*c*, especially no pin 16*a*, 16*b* and no welding dome 16*c* is arranged, back-scattering at this place is low and, therefore, the signal recorded by the photodiodes is low. If, on the contrary, laser light hits a position at which a workpiece 16*a*, 16*b*, 16*c*, especially a pin 16*a*, 16*b* or a welding dome 16*c*, is arranged, the back-scattering is large, especially compared to the position where no workpiece 16*a*, 16*b*, 16*c* is arranged. At least, the signal is so large that it allows an unambiguous allocation whether a workpiece 16*a*, 16*b*, 16*c* is arranged at this position or not. Substantially, this requires that the signal sufficiently contrasts a noise signal.

Figure 12:
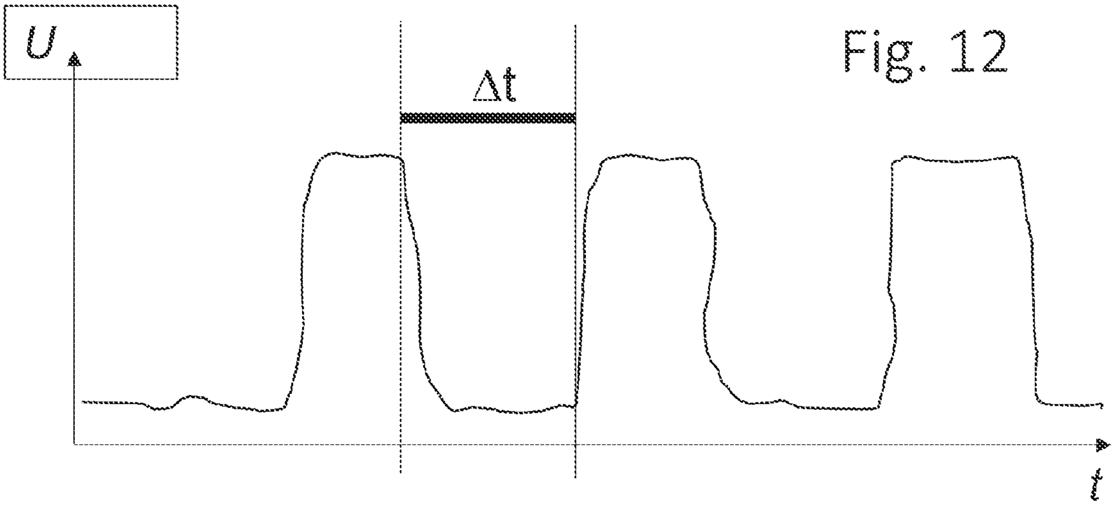
FIG. 12 shows a measurement signal progression corresponding to the arrangement shown in FIG. 11.

FIG. 12 shows a diagram of an exemplary measurement signal progression corresponding to the arrangement shown in FIG. 11. On the vertical axis, a voltage U (in the unit Volts) is outlined. The voltage U is acquired in the sensor module 26. Especially, the voltage U is proportional to the light intensity acquired by the sensor module 26 of the light reflected at the surface of a component. On the horizontal axis, a time t (in the unit seconds) is outlined in a time interval, in which the voltage U is acquired.

If the track speed v and the course of the track or the measurement path, respectively, are known, distances between two workpieces 16*a*, 16*b*, 16*c* may be established from the diagram. The diagram corresponds, as already discussed, to plotting the measurement signal, especially a voltage U acquired at the sensor module, against the time t required for tracing the track.

In the diagram of FIG. 12, three almost box-shaped voltage signals can be recognized. These three voltage signals correspond to the time t, in which the laser respectively traverses one of three welding domes 16*c* and thus a high proportion of the light is reflected at the welding domes 16*c* and acquired by the sensor module 26. The time intervals shown between the box-shaped voltage signals in which the acquired voltage is very low, correspond to the moments in which the laser beam impinges on the support device 38 or the substrate, respectively, on which the welding domes 16*c* are arranged. On the support device 38 itself, only relatively little light of the laser is reflected, so that correspondingly small light intensities are acquired by the sensor module 26 and, therefore, the acquired voltage V is low. Here, this may be a first measurement path 44 or a second measurement path 45.

Based on the known track speed v and the duration of the traversal of a welding dome 16*c* to an adjacent welding dome 16*c*, the distance d1 or d2 or also the diameter or the size, respectively, of the welding dome may be determined. The respective distance d1 or d2 may either correspond to an interval between the opposite edges of the adjacent welding domes 16*c*, the opposite edges of the adjacent welding domes 16*c*, or an interval between the central positions, especially the centers of the respective adjacent welding domes 16*c*. The distance d1 or d2 may be established according to the following equation 1:

$$d1,d2=v\times\Delta t$$

d1, d2 is the distance d1 or d2, v is the track speed, and Δt is the temporal interval or the time difference Δt, respectively, for tracing a track between two adjacent welding domes 16*c*. Since the temporal interval Δt shown in FIG. 12 for reaching an adjacent welding dome 16*c* is indicated, this is the determination of the distance d1, d2 between two opposite edges of the adjacent welding domes 16*c*. In other words, in FIG. 12, the interval from edge to edge of two adjacent welding domes 16*c* is established.

So far, a method was presented (method 1) in which the voltage, U, is measured over the time, t. Through knowledge of the speed of the focus point of the pilot laser, according to the above equation, the distance, d, may be calculated. An alternative looks as follows (method 2): as in method 1, sensor signals are captured by a photodiode and the voltage is plotted over the time. As opposed to method 1, this measurement record is now not set in relation to the speed, but the positions of the galvos (=the scanner mirrors) are being read out. By knowledge of the position of the galvos, the position of the focus point of the pilot laser may be inferred. Summary:

1) A method 1: Photodiode supplies voltage signal over time→through the speed, it is possible to calculate the path.
2) A method 2: Photodiode supplies voltage signal over time→through the position of the galvos (=scanner mirrors), it is possible to attribute the position on the component.

In both cases, therefore, the voltage signal may be related to the position on the component and, thus, intervals may be determined.

The interval d1, d2 between two adjacent welding domes 16*c* is referred to as creepage distance. The quality evaluation of a component with workpieces after laser machining may be determined by means of the creepage distance or the creepage distances, respectively. For example, a component may not fulfill the quality criteria if the creepage distance goes below a minimum value.

Therefore, the method of the invention may be applied in the pre-process, but especially also in a post-process. In the post-process, for example, creepage distances d1, d2 between welded pins 16*a*, 16*b*, which illustrate welding domes 16*c* or welding seams, and/or a diameter or a size, respectively, of the welding domes 16*c* are determined. In the pre-process, for example, intervals between pins 16*a*, 16*b* are determined. FIGS. 11 and 12 relate to a post-process analysis. However, the mentioned method features may be analogously transferred to pre-process analyses.

LIST OF REFERENCE SYMBOLS

10 laser machining system
12 laser machining apparatus
14 measurement beam
16*a*, 16*b* workpieces before a laser welding process
16*c* welding joint or dome, respectively, after a laser welding process
17*a*, 17*b* ends
18 optical fiber
20 reflected measurement radiation
22 beam splitter
26 sensor module
30 control unit
32*a*, 32*b* conductor
33*a*, 33*b* insulation material
36 gap
38 support device
39 through hole
40*a*, 40*b*, 40*c* first measurement paths
42*a*, 42*b* second measurement paths
43 interval between workpieces
44 first measurement path
45 second measurement path
A state before the laser machining (pre-process state)
B state after the laser machining (post-process state)
d1, d2 intervals between two adjacent welding joints or domes, respectively
Δt temporal interval between the acquisition of two adjacent welding joints or domes, respectively
t time axis with unit seconds (s)
U axis with unit volts (V)

The invention claimed is:

1. A method for machining a workpiece by a laser beam generated by a laser source, the method comprising:
determining a position of the workpiece; and
radiating said laser beam to said workpiece for machining said workpiece based on said determined position of said workpiece,
wherein said determining of said position of the workpiece comprises:
radiating a measurement beam to at least one workpiece and a support device, which holds said at least one workpiece and at least partly surrounds the same along at least one first measurement path and along at least one second measurement path, wherein said measurement beam is generated by said laser source;
acquiring a portion of said radiated measurement beam reflected by said support device and said at least one workpiece along said at least one first measurement path and along said at least one second measurement path and decoupled by a beam splitter from a beam path of the laser beam by at least one photodiode and generating a corresponding measurement signal, said support device and said at least one workpiece being different from each other in reflectivity; and
determining a position of said at least one workpiece based on said measurement signal.

2. The method according to claim 1, wherein:
a surface of said support device and a surface of said at least one workpiece, to which said measurement beam is radiated, consists of different materials and/or exhibits different surface roughnesses; and/or
said surface of said support device is of a metal, especially of aluminum or steel, or comprises the same; and/or
said surface of said at least one workpiece is of a metal, especially of copper, or comprises the same.

3. The method according to claim 1, wherein:
said radiated measurement beam exhibits a power of fewer than 300 watts or a power lower than a laser power for said laser machining process and/or is moved along said measurement paths with a speed of at least 0.3 m/s; and/or
an energy input by said radiated measurement beam is adapted such that said measurement beam does not modify and/or melt said at least one workpiece.

4. The method according to claim 1, wherein said at least one first measurement path and/or said at least one second measurement path comprises a first area and a third area on said support device as well as a second area on said at least one workpiece, said second area arranged between said first area and said third area.

5. The method according to claim 1, wherein:
said at least one first measurement path and said at least one second measurement path is linear; and/or
predetermined angle is 90°; and/or
said at least one first measurement path comprises a plurality of first measurement paths parallel and offset from each other; and/or
said at least one second measurement path comprises a plurality of second measurement paths parallel and offset from each other.

6. The method according to claim 1, wherein:
said at least one first measurement path is circular; and/or
said at least one second measurement path is linear; and/or
said at least one first measurement path comprises a plurality of circular concentrically arranged first measurement paths; and/or
said at least one second measurement path comprises a plurality of linear and intersecting second measurement paths.

7. The method according to claim 1, wherein radiating said measurement beam along said at least one first measurement path and/or along said at least one second measurement path occurs with constant speed.

8. The method according to claim 1, wherein, for determining said position of said at least one workpiece, said measurement beam is determined to be reflected at a point of said surface of said at least one workpiece, when said measurement signal at said corresponding place is equal to or larger than a predetermined first value.

9. The method according to claim 1, wherein determining said position of said at least one workpiece based on said measurement signal comprises:
determining whether said at least one workpiece is present in or at said support device.

10. The method according to claim 1, wherein determining said position of said at least one workpiece occurs taking into account a diameter of said measurement beam on said at least one workpiece.

11. The method according to claim 1, wherein:
a first workpiece and a second workpiece are arranged in said support device; and
said position of said first workpiece, and/or said position of said second workpiece, and/or a position of said first and second workpieces relative to each other, and/or an interval between said first and second workpieces, and/or a position and/or extension of a gap between said first and second workpieces, and/or a diameter of a machining result, and/or a position of first and second machining results relative to each other, and/or an interval between said first and second machining results are determined.

12. The method according to claim 1, wherein:
said at least one workpiece is or comprises an electrode, a bar-shaped electrode, an i-pin, a hairpin, or a winding segment of a stator winding; and/or
said support device comprises: a component, and/or a battery, and/or a jig for clamping said at least one workpiece, and/or a jig in which two workpieces to be welded to each other or welded to each other are chucked.

13. The method according to claim 1, comprising:
machining a plurality of workpieces by radiating the laser beam to two adjacent workpieces, respectively, and welding together said two adjacent workpieces, wherein a plurality of welding domes is generated,
wherein determining a position of said workpiece comprises determining at least one interval between two adjacent welding domes.

14. A laser machining system for machining a workpiece by a laser beam generated by a laser source, comprising:
a laser machining apparatus for radiating a measurement beam to said workpiece;
a beam splitter arranged for decoupling reflected measurement radiation from a beam path of said laser beam;
a sensor module with at least one photodiode for acquiring reflected measurement radiation decoupled by said beam splitter from said beam path of the laser beam; and
a control unit, configured to:
determine a position of said workpiece, wherein said determination of the position of said workpiece comprises:
radiate said measurement beam to at least one workpiece and a support device, which holds said at least one workpiece and at least partly surrounds the same along at least one first measurement path and along at least one second measurement path, wherein said measurement beam is generated by the laser source;
acquire a portion of said radiated measurement beam reflected by said support device and said at least one workpiece along said at least one first measurement path and along said at least one second measurement path and decoupled by the beam splitter from the beam path of the laser beam by the at least one photodiode and generating a corresponding measurement signal, said support device and said at least one workpiece being different from each other in reflectivity; and
determine a position of said at least one workpiece based on said measurement signal; and
radiate the laser beam to said workpiece for machining said workpiece based on said determined position of said workpiece.

15. The laser machining system according to claim 14, wherein said laser machining apparatus comprises a deflection unit for deflecting said measurement beam along said measurement paths.

16. The laser machining system according to claim 14, further comprising:
a surface of said support device and a surface of said at least one workpiece, to which said measurement beam is radiated, consists of different materials and/or exhibits different surface roughnesses; and/or
said surface of said support device is of a metal, especially of aluminum or steel, or comprises the same; and/or
said surface of said at least one workpiece is of a metal, especially of copper, or comprises the same.

17. The laser machining system according to claim 14, wherein:
said radiated measurement beam exhibits a power of fewer than 300 watts or a power lower than a laser power for said laser machining process and/or is moved along said measurement paths with a speed of at least 0.3 m/s; and/or
an energy input by said radiated measurement beam is adapted such that said measurement beam does not modify and/or melt said at least one workpiece.

18. The laser machining system according to claim 14, wherein said at least one first measurement path and/or said at least one second measurement path comprises a first area and a third area on said support device as well as a second area on said at least one workpiece, said second area arranged between said first area and said third area.

19. The laser machining system according to claim 14, wherein:

said at least one first measurement path and said at least one second measurement path is linear; and/or predetermined angle is 90°; and/or said at least one first measurement path comprises a plurality of first measurement paths parallel and offset from each other; and/or said at least one second measurement path comprises a plurality of second measurement paths parallel and offset from each other.

20. The laser machining system according to claim 14, wherein:

said at least one first measurement path is circular; and/or said at least one second measurement path is linear; and/or said at least one first measurement path comprises a plurality of circular concentrically arranged first measurement paths; and/or said at least one second measurement path comprises a plurality of linear and intersecting second measurement paths.

* * * * *